United States Patent
Nováczki et al.

(10) Patent No.: US 12,302,132 B2
(45) Date of Patent: May 13, 2025

(54) FEDERATED LEARNING OF GROWING NEURAL GAS MODELS

(71) Applicant: Nokia Solutions and Networks Oy, Espoo (FI)

(72) Inventors: Szabolcs Nováczki, Budapest (HU); Péter Szilágyi, Budapest (HU); Lajos Bajzik, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/643,994

(22) Filed: Apr. 23, 2024

(65) Prior Publication Data

US 2024/0365135 A1    Oct. 31, 2024

(30) Foreign Application Priority Data

Apr. 26, 2023 (FI) ...................................... 20235467

(51) Int. Cl.
*H04W 24/02* (2009.01)
*H04L 43/0823* (2022.01)
*H04W 24/08* (2009.01)

(52) U.S. Cl.
CPC ......... *H04W 24/02* (2013.01); *H04L 43/0823* (2013.01); *H04W 24/08* (2013.01)

(58) Field of Classification Search
None
See application file for complete search history.

(56) References Cited

U.S. PATENT DOCUMENTS

| | | |
|---|---|---|
| 2021/0374617 A1 | 12/2021 | Chu et al. |
| 2021/0398017 A1 | 12/2021 | Garg et al. |
| 2022/0052925 A1 | 2/2022 | Vandikas et al. |
| 2022/0294606 A1 | 9/2022 | Norrman et al. |
| 2022/0351039 A1 | 11/2022 | Satheesh Kumar et al. |
| 2022/0374713 A1 | 11/2022 | Wu et al. |
| 2022/0398500 A1 | 12/2022 | Singhal et al. |

(Continued)

FOREIGN PATENT DOCUMENTS

| | | | |
|---|---|---|---|
| EP | 3742669 A1 | 11/2020 | |
| WO | WO-2021064737 A1 * | 4/2021 | ........... G06N 3/0464 |
| WO | 2021/144037 A1 | 7/2021 | |

(Continued)

OTHER PUBLICATIONS

Gajic et al., "An improved anomaly detection in mobile networks by using incremental time-aware clustering", IFIP, 2015. (Year: 2015).*

(Continued)

*Primary Examiner* — Faruk Hamza
*Assistant Examiner* — Cassandra L Decker
(74) *Attorney, Agent, or Firm* — Nokia Technologies Oy

(57) ABSTRACT

Disclosed is a method comprising receiving a plurality of local growing neural gas models from a plurality of distributed trainers, wherein a local growing neural gas model of the plurality of local growing neural gas models represents a local state model of at least one radio access network node; and training a global growing neural gas model based on the plurality of local growing neural gas models, wherein the global growing neural gas model represents a global state model of a plurality of radio access network nodes.

20 Claims, 14 Drawing Sheets

(56) References Cited

U.S. PATENT DOCUMENTS

Figure 1:
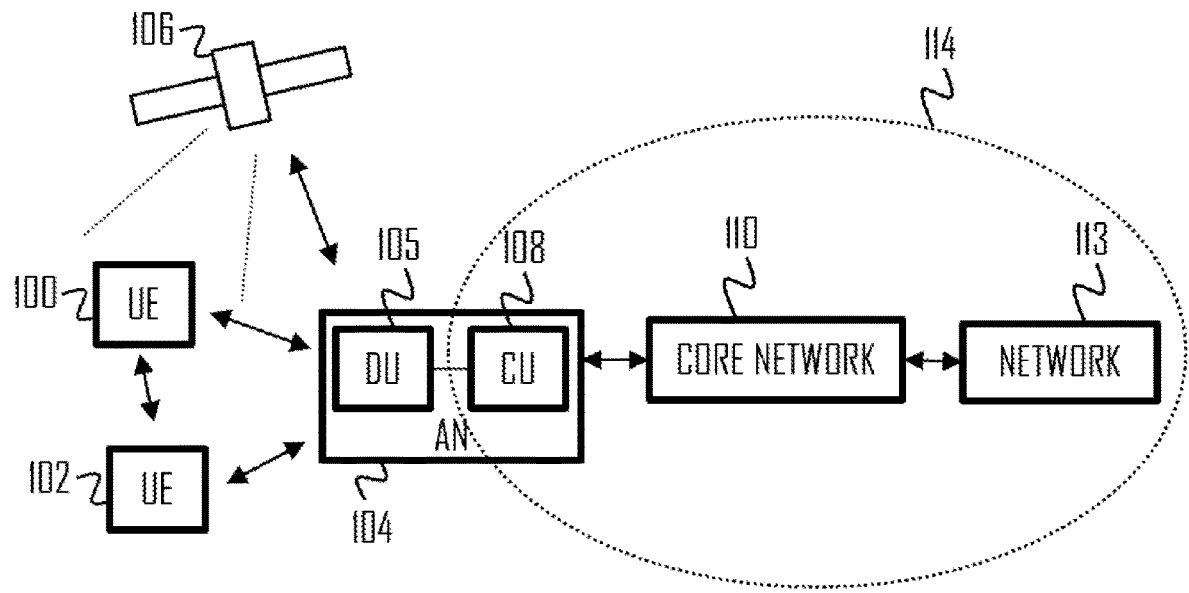

| | | | |
|---|---|---|---|
| 2023/0044035 A1 | 2/2023 | Martins | |
| 2023/0353982 A1* | 11/2023 | Routt | G06N 3/045 |

FOREIGN PATENT DOCUMENTS

| | | |
|---|---|---|
| WO | 2021/158313 A1 | 8/2021 |
| WO | 2021/213685 A1 | 10/2021 |
| WO | 2022/060264 A1 | 3/2022 |
| WO | 2022/133865 A1 | 6/2022 |
| WO | 2022/233511 A2 | 11/2022 |
| WO | 2022/243980 A1 | 11/2022 |

OTHER PUBLICATIONS

Office action received for corresponding Finnish Patent Application No. 20235467, dated Aug. 26, 2024, 6 pages.

Extended European Search Report received for corresponding European Patent Application No. 24170676.1, dated Oct. 10, 2024, 10 pages.

Andreakis et al., "Incremental Unsupervised Time Series Analysis using Merge Growing Neural Gas", Proceedings of the 7th International Workshop on Advances in Self-Organizing Maps, Jun. 8-10, 2009, pp. 1-10.

Estevez et al., "Window Merge Neural Gas for Processing Pattern Sequences", Proceedngs of International Joint Conference on Neural Networks, Aug. 12-17, 2007, 6 pages.

Ventocilla et al., "Scaling the Growing Neural Gas for Visual Cluster Analysis", Big Data Research, vol. 26, Article 100254, Nov. 2021, pp. 1-14.

"AVA—Network Data Analytics Function", Nokia, Retrieved on Aug. 27, 2024, Webpage available at : https://www.nokia.com/networks/bss-oss/nwdaf/.

Bahl, "Edge Computing for the Infrastructure", Microsoft, Mar. 5, 2020, pp. 1-48.

Fritzke, "A Growing Neural Gas Network Learns Topologies", Proceedings of the 7th International Conference on Neural Information Processing Systems, Jan. 1, 1994, pp. 625-632.

Perifanis et al., "Federated Learning for 5G Base Station Traffic Forecasting", arXiv, Aug. 26, 2023, pp. 1-21.

Vojacek et al., "Growing Neural Gas—A Parallel Approach", 12th International Conference on Information Systems and Industrial Management (CISIM), Sep. 25-27, 2013, pp. 1-12.

"IEEE 802.11", Wikipedia, Retrieved on Aug. 27, 2024, Webpage available at : https://en.wikipedia.org/wiki/IEEE_802.11.

"IEEE 802.15", Wikipedia, Retrieved on Aug. 27, 2024, Webpage available at : https://en.wikipedia.org/wiki/IEEE_802.15.

Office action received for corresponding Finnish Patent Application No. 20235467, dated Oct. 30, 2023, 17 pages.

Novaczki et al., "Fixed-Resolution Growing Neural Gas for Clustering the Mobile Networks Data", International Conference on Engineering Applications of Neural Networks, Sep. 25-28, 2015, pp. 181-191.

Office action received for corresponding Finnish Patent Application No. 20235467, dated Mar. 26, 2024, 10 pages.

* cited by examiner

FEDERATED LEARNING OF GROWING NEURAL GAS MODELS

RELATED APPLICATION

This application claim benefit of priority from Finnish Patent App. No. 20235467, filed Apr. 26, 2023, the disclosure of which is hereby incorporated in its entirety by reference herein.

FIELD

The following example embodiments relate to wireless communication and to machine learning.

BACKGROUND

As resources are limited, it is desirable to optimize the usage of network resources.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory storing instructions that, when executed by the at least one processor, cause the apparatus at least to: receive a plurality of local growing neural gas models from a plurality of distributed trainers, wherein a local growing neural gas model of the plurality of local growing neural gas models represents a local state model of at least one radio access network node; and train a global growing neural gas model based on the plurality of local growing neural gas models, wherein the global growing neural gas model represents a global state model of a plurality of radio access network nodes.

According to another aspect, there is provided an apparatus comprising: means for receiving a plurality of local growing neural gas models from a plurality of distributed trainers, wherein a local growing neural gas model of the plurality of local growing neural gas models represents a local state model of at least one radio access network node; and means for training a global growing neural gas model based on the plurality of local growing neural gas models, wherein the global growing neural gas model represents a global state model of a plurality of radio access network nodes.

According to another aspect, there is provided a method comprising: receiving a plurality of local growing neural gas models from a plurality of distributed trainers, wherein a local growing neural gas model of the plurality of local growing neural gas models represents a local state model of at least one radio access network node; and training a global growing neural gas model based on the plurality of local growing neural gas models, wherein the global growing neural gas model represents a global state model of a plurality of radio access network nodes.

According to another aspect, there is provided a computer program comprising instructions which, when executed by an apparatus, cause the apparatus to perform at least the following: receiving a plurality of local growing neural gas models from a plurality of distributed trainers, wherein a local growing neural gas model of the plurality of local growing neural gas models represents a local state model of at least one radio access network node; and training a global growing neural gas model based on the plurality of local growing neural gas models, wherein the global growing neural gas model represents a global state model of a plurality of radio access network nodes.

According to another aspect, there is provided a computer readable medium comprising program instructions which, when executed by an apparatus, cause the apparatus to perform at least the following: receiving a plurality of local growing neural gas models from a plurality of distributed trainers, wherein a local growing neural gas model of the plurality of local growing neural gas models represents a local state model of at least one radio access network node; and training a global growing neural gas model based on the plurality of local growing neural gas models, wherein the global growing neural gas model represents a global state model of a plurality of radio access network nodes.

According to another aspect, there is provided a non-transitory computer readable medium comprising program instructions which, when executed by an apparatus, cause the apparatus to perform at least the following: receiving a plurality of local growing neural gas models from a plurality of distributed trainers, wherein a local growing neural gas model of the plurality of local growing neural gas models represents a local state model of at least one radio access network node; and training a global growing neural gas model based on the plurality of local growing neural gas models, wherein the global growing neural gas model represents a global state model of a plurality of radio access network nodes.

According to another aspect, there is provided an apparatus comprising at least one processor, and at least one memory storing instructions that, when executed by the at least one processor, cause the apparatus at least to: train a local growing neural gas model based on local training data comprising state information associated with at least one radio access network node, wherein the local growing neural gas model represents a local state model of the at least one radio access network node; and transmit the local growing neural gas model to a central trainer configured to train a global growing neural gas model based on a plurality of local growing neural gas models trained at a plurality of distributed trainers, wherein the plurality of local growing neural gas models comprise at least the local growing neural gas model transmitted to the central trainer, wherein the global growing neural gas model represents a global state model of a plurality of radio access network nodes.

According to another aspect, there is provided an apparatus comprising: means for training a local growing neural gas model based on local training data comprising state information associated with at least one radio access network node, wherein the local growing neural gas model represents a local state model of the at least one radio access network node; and means for transmitting the local growing neural gas model to a central trainer configured to train a global growing neural gas model based on a plurality of local growing neural gas models trained at a plurality of distributed trainers, wherein the plurality of local growing neural gas models comprise at least the local growing neural gas model transmitted to the central trainer, wherein the global growing neural gas model represents a global state model of a plurality of radio access network nodes.

According to another aspect, there is provided a method comprising: training a local growing neural gas model based on local training data comprising state information associated with at least one radio access network node, wherein the local growing neural gas model represents a local state model of the at least one radio access network node; and transmitting the local growing neural gas model to a central trainer configured to train a global growing neural gas model based on a plurality of local growing neural gas models trained at a plurality of distributed trainers, wherein the plurality of local growing neural gas models comprise at least the local growing neural gas model transmitted to the central trainer, wherein the global growing neural gas model represents a global state model of a plurality of radio access network nodes.

According to another aspect, there is provided a computer program comprising instructions which, when executed by an apparatus, cause the apparatus to perform at least the following: training a local growing neural gas model based on local training data comprising state information associated with at least one radio access network node, wherein the local growing neural gas model represents a local state model of the at least one radio access network node; and transmitting the local growing neural gas model to a central trainer configured to train a global growing neural gas model based on a plurality of local growing neural gas models trained at a plurality of distributed trainers, wherein the plurality of local growing neural gas models comprise at least the local growing neural gas model transmitted to the central trainer, wherein the global growing neural gas model represents a global state model of a plurality of radio access network nodes.

According to another aspect, there is provided a computer readable medium comprising program instructions which, when executed by an apparatus, cause the apparatus to perform at least the following: training a local growing neural gas model based on local training data comprising state information associated with at least one radio access network node, wherein the local growing neural gas model represents a local state model of the at least one radio access network node; and transmitting the local growing neural gas model to a central trainer configured to train a global growing neural gas model based on a plurality of local growing neural gas models trained at a plurality of distributed trainers, wherein the plurality of local growing neural gas models comprise at least the local growing neural gas model transmitted to the central trainer, wherein the global growing neural gas model represents a global state model of a plurality of radio access network nodes.

According to another aspect, there is provided a non-transitory computer readable medium comprising program instructions which, when executed by an apparatus, cause the apparatus to perform at least the following: training a local growing neural gas model based on local training data comprising state information associated with at least one radio access network node, wherein the local growing neural gas model represents a local state model of the at least one radio access network node; and transmitting the local growing neural gas model to a central trainer configured to train a global growing neural gas model based on a plurality of local growing neural gas models trained at a plurality of distributed trainers, wherein the plurality of local growing neural gas models comprise at least the local growing neural gas model transmitted to the central trainer, wherein the global growing neural gas model represents a global state model of a plurality of radio access network nodes.

According to another aspect, there is provided a system comprising at least a central trainer and a plurality of distributed trainers. The plurality of distributed trainers are configured to: train a plurality of local growing neural gas model based on local training data comprising state information associated with at least one radio access network node, wherein a local growing neural gas model of the plurality of local growing neural gas models represents a local state model of the at least one radio access network node; and transmit the plurality of local growing neural gas models to the central trainer. The central trainer is configured to: receive the plurality of local growing neural gas models from the plurality of distributed trainers; and train a global growing neural gas model based on the plurality of local growing neural gas models, wherein the global growing neural gas model represents a global state model of a plurality of radio access network nodes.

According to another aspect, there is provided a system comprising at least a central trainer and a plurality of distributed trainers. The plurality of distributed trainers comprise: means for training a plurality of local growing neural gas model based on local training data comprising state information associated with at least one radio access network node, wherein a local growing neural gas model of the plurality of local growing neural gas models represents a local state model of the at least one radio access network node; and means for transmitting the plurality of local growing neural gas models to the central trainer. The central trainer comprises: means for receiving the plurality of local growing neural gas models from the plurality of distributed trainers; and means for training a global growing neural gas model based on the plurality of local growing neural gas models, wherein the global growing neural gas model represents a global state model of a plurality of radio access network nodes.

LIST OF DRAWINGS

Figure 2:
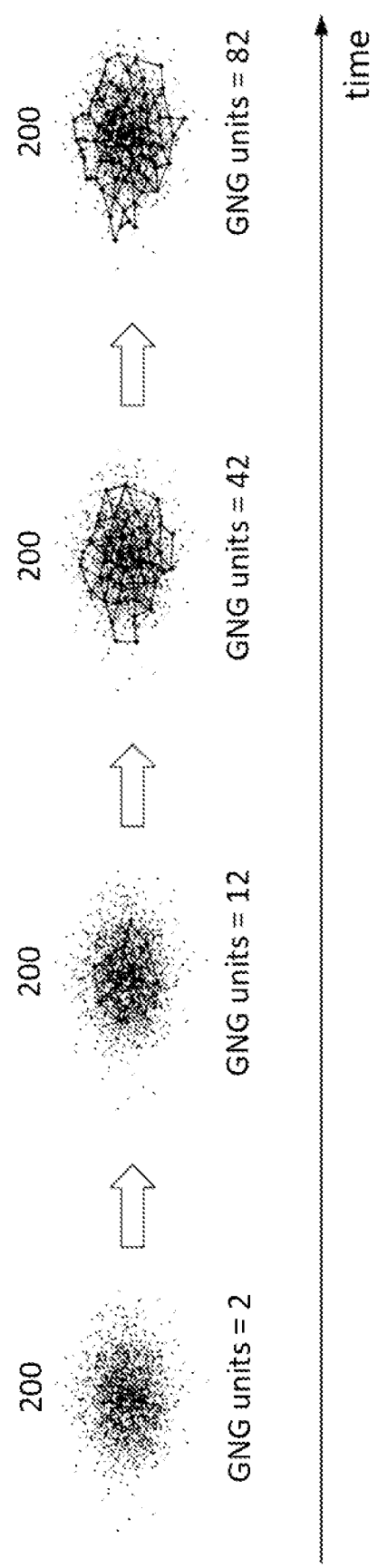
Figure 3A:
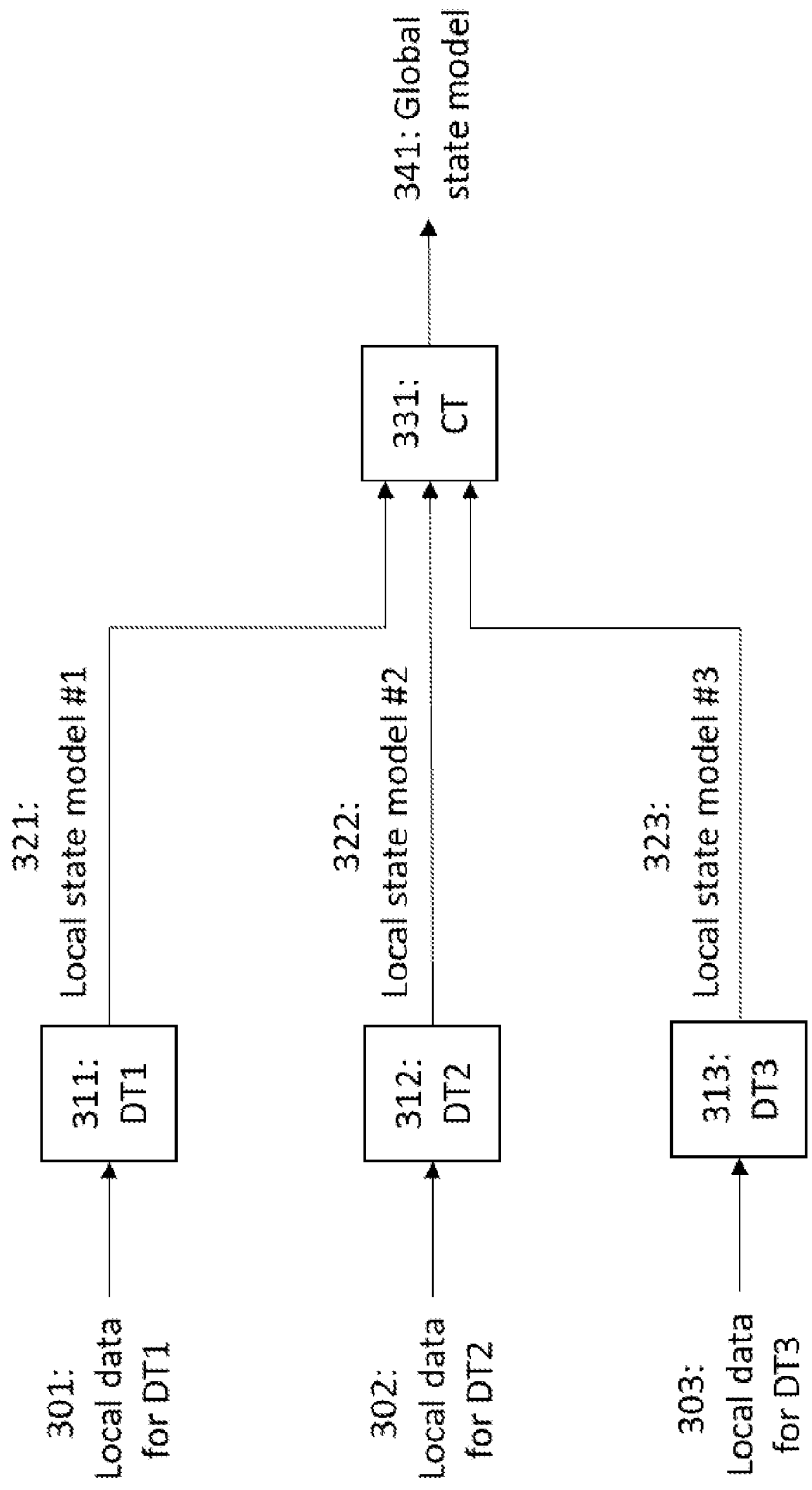
Figure 3B:
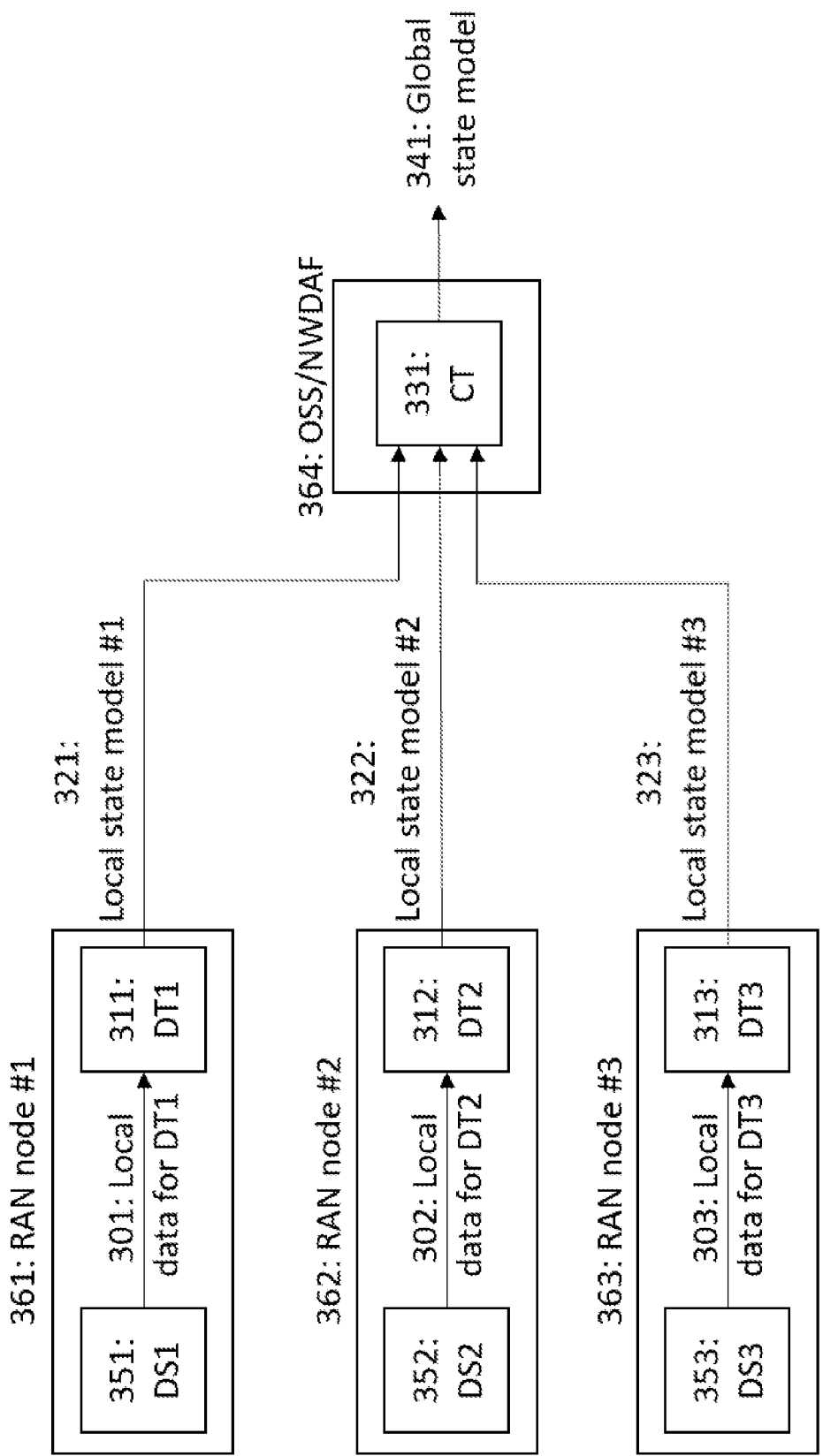
Figure 3C:
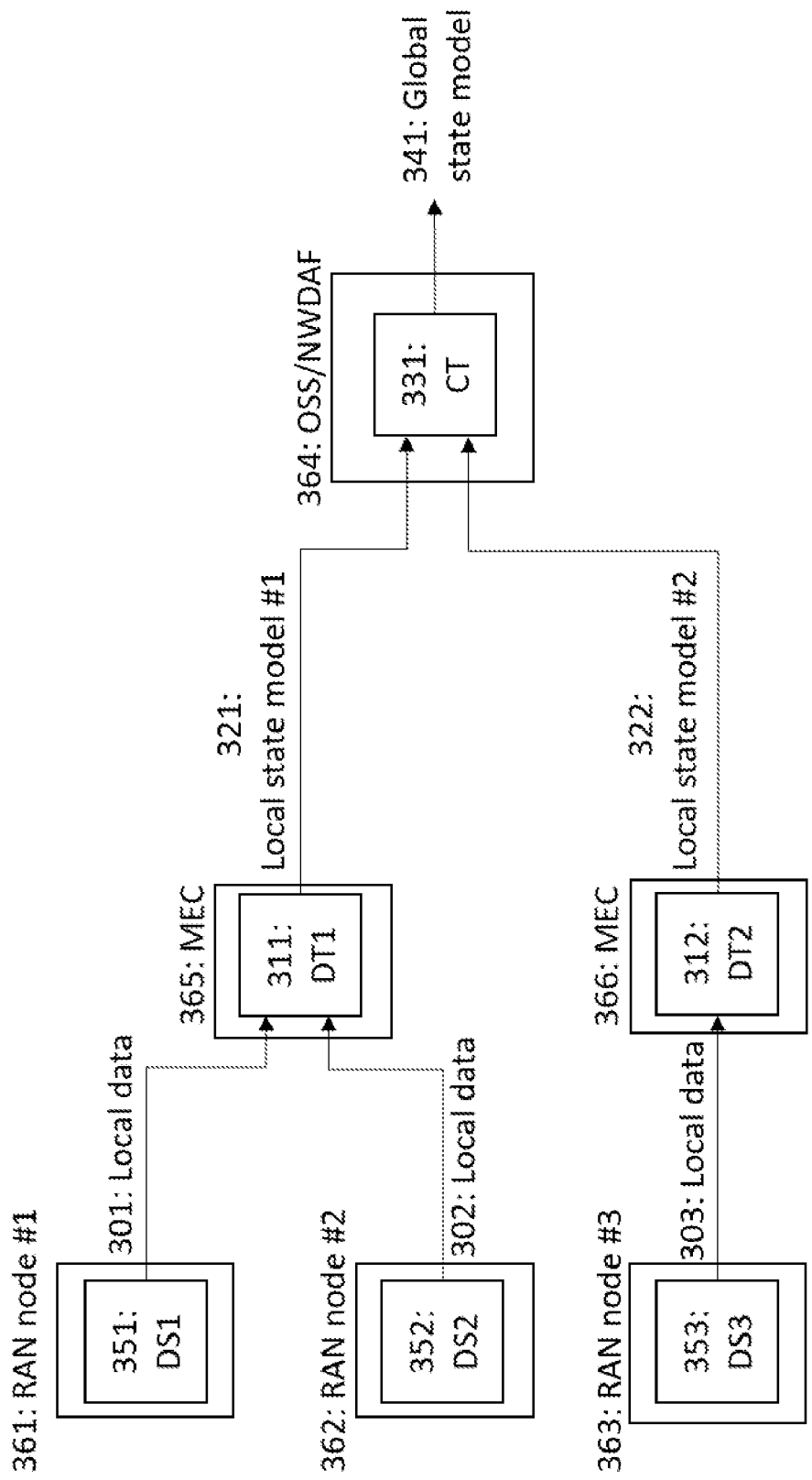
Figure 3D:
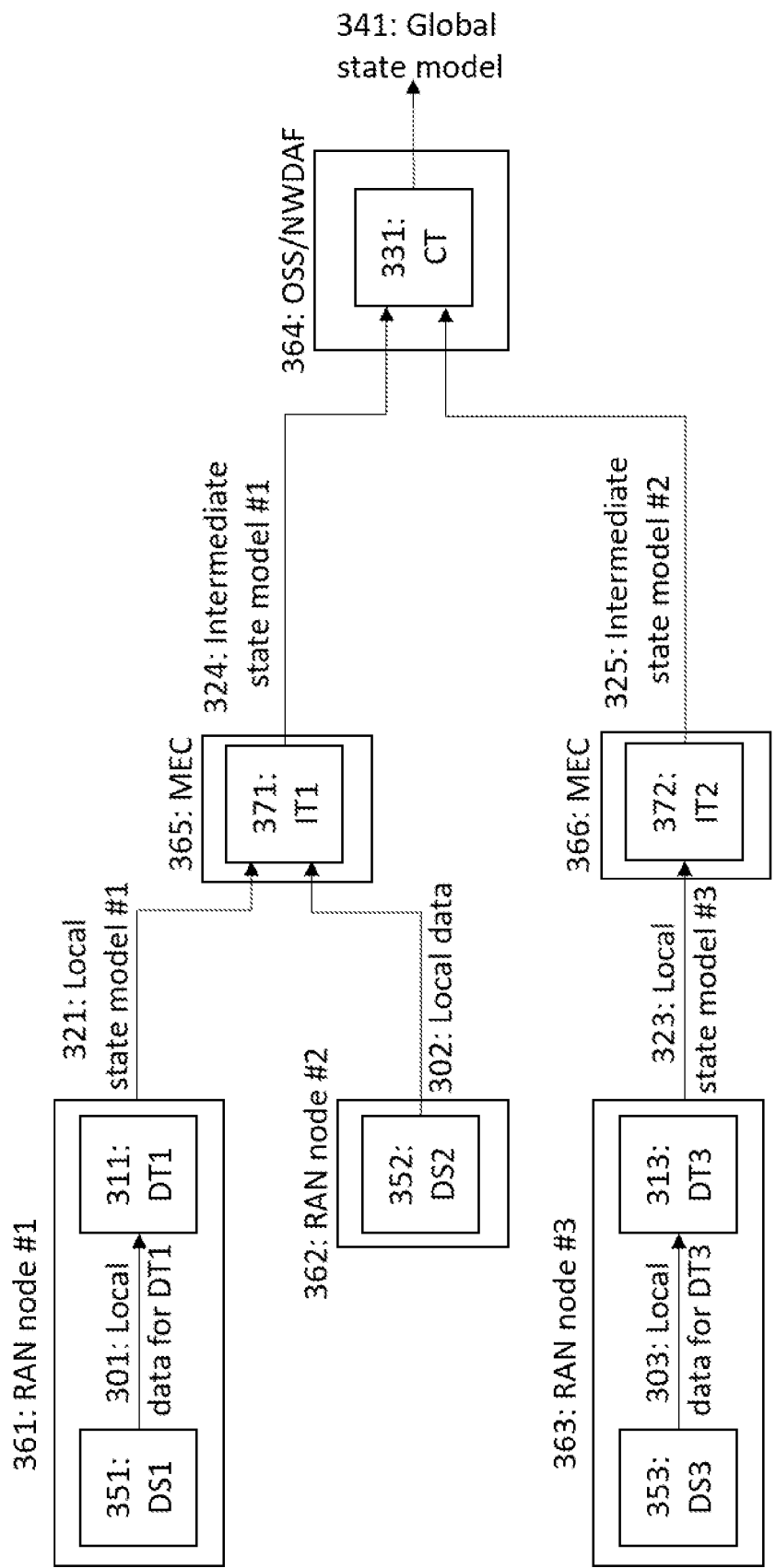
Figure 3E:
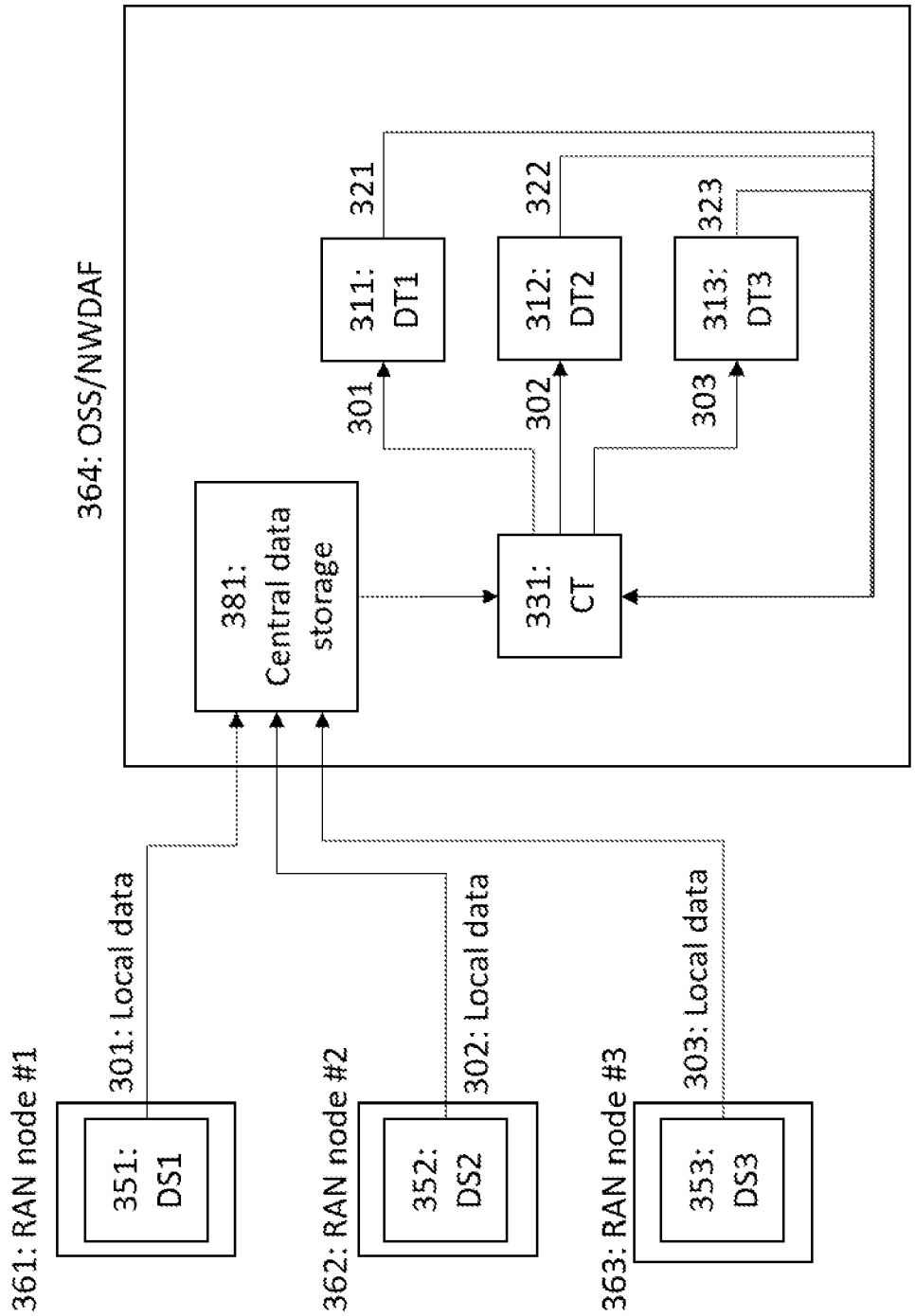
Figure 4:
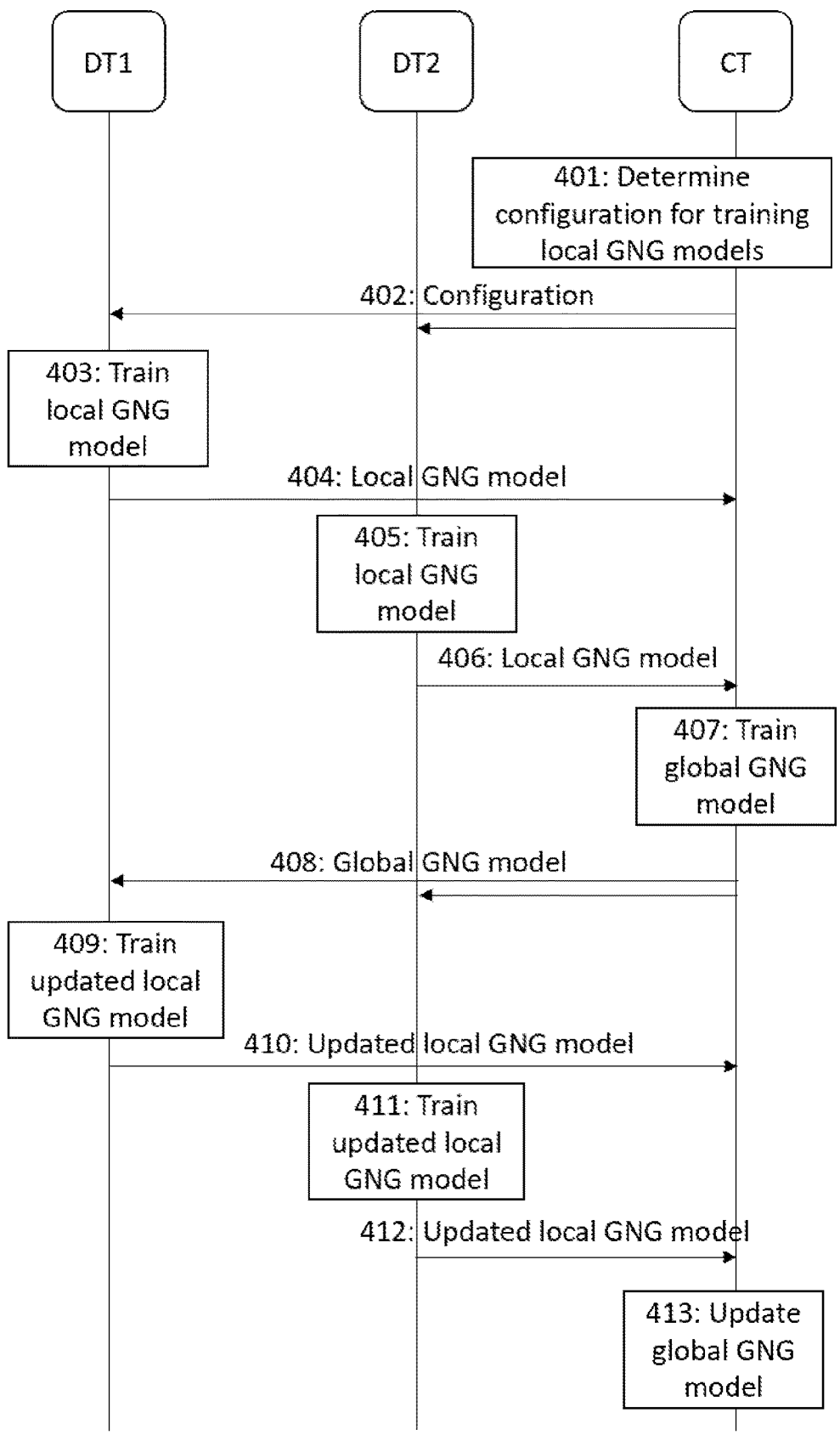
Figure 5:
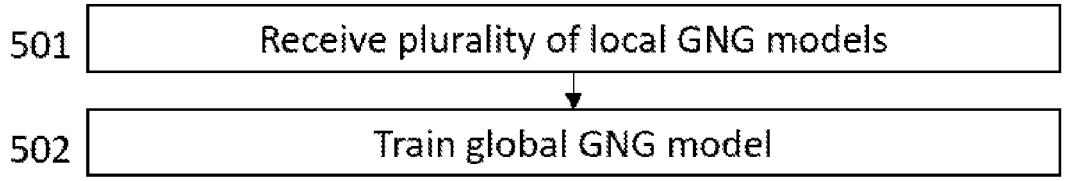
Figure 6:
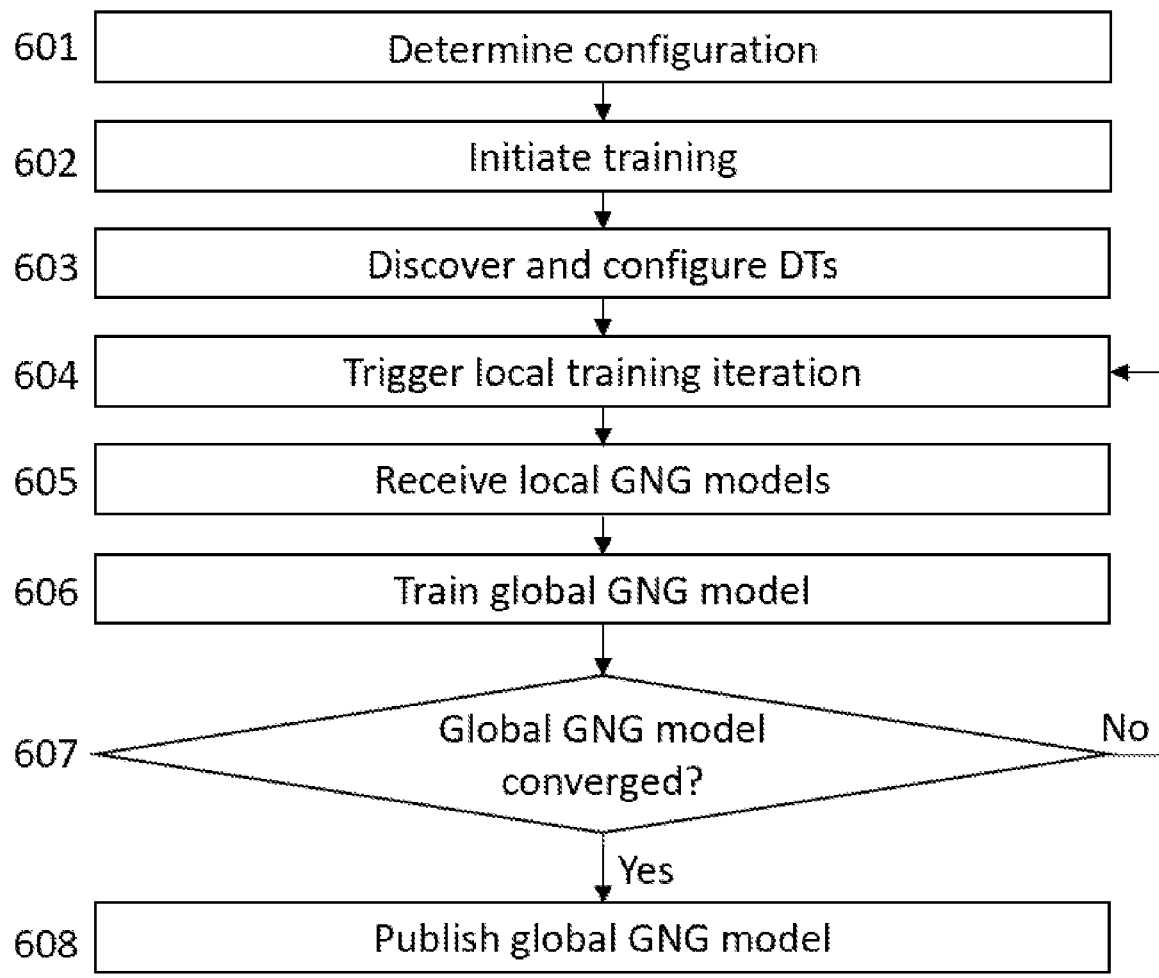
Figure 7:
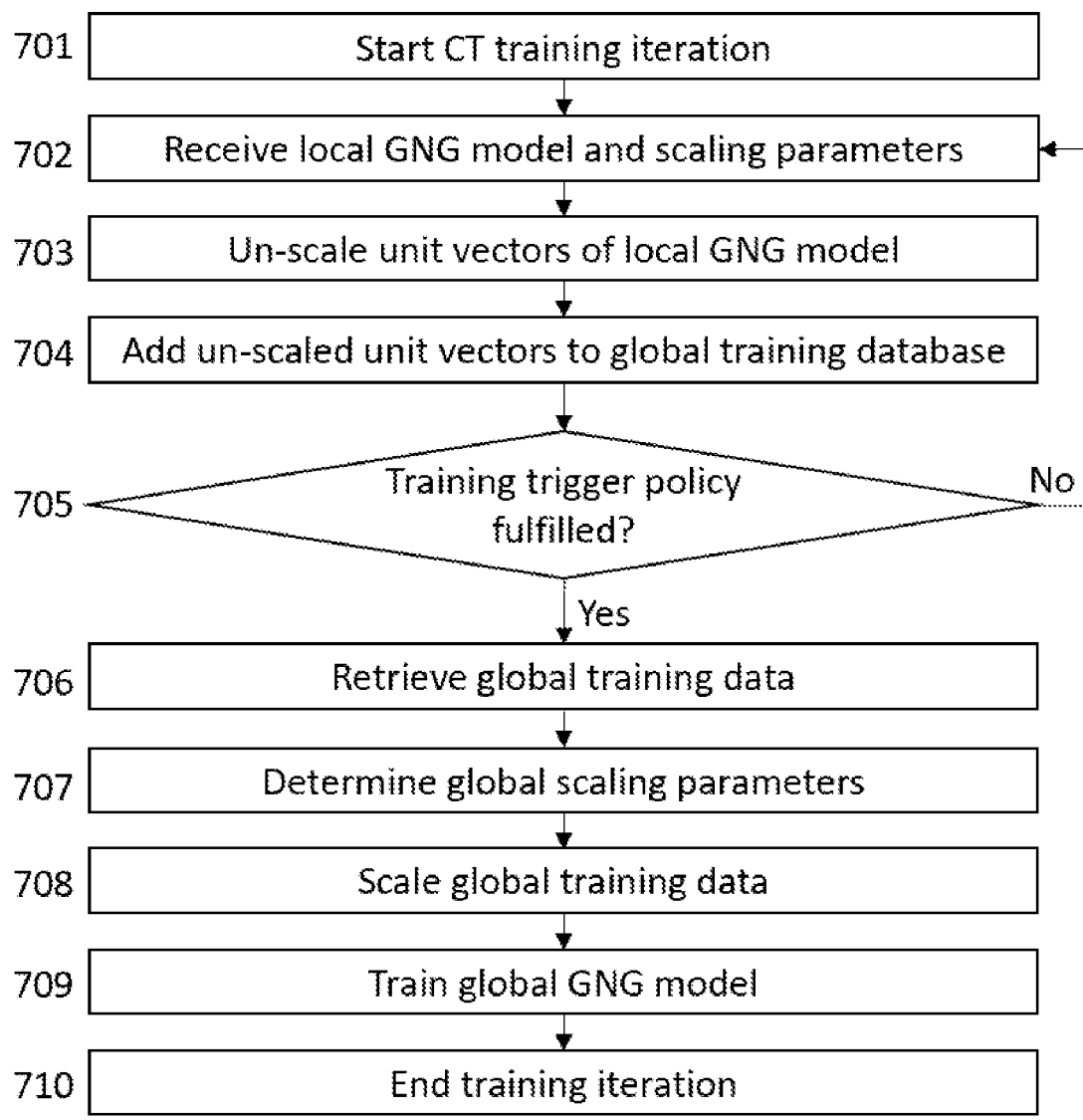
Figure 8:
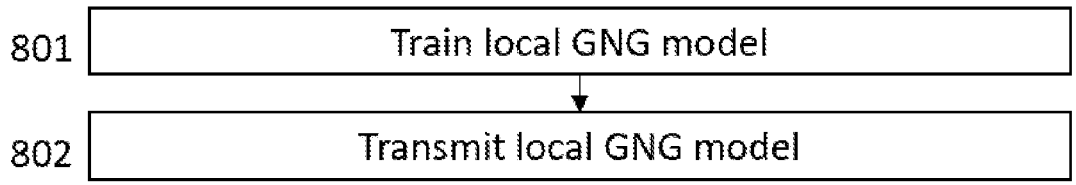
Figure 9:
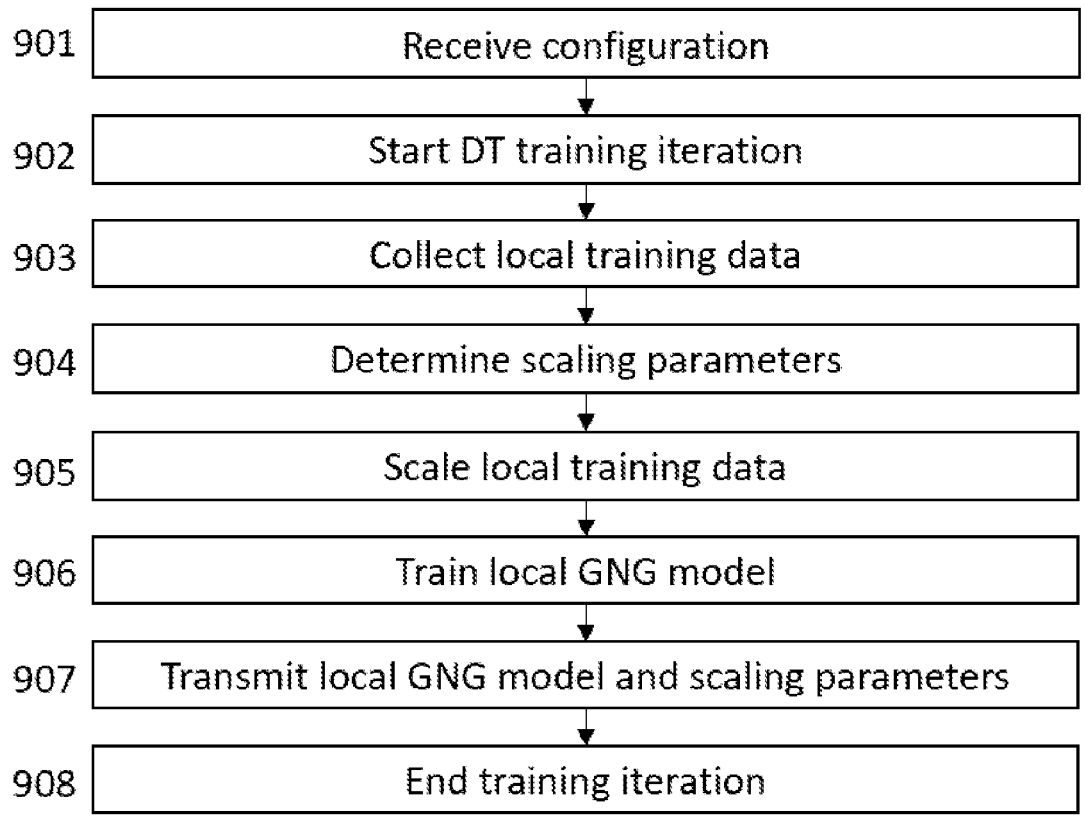
Figure 10:
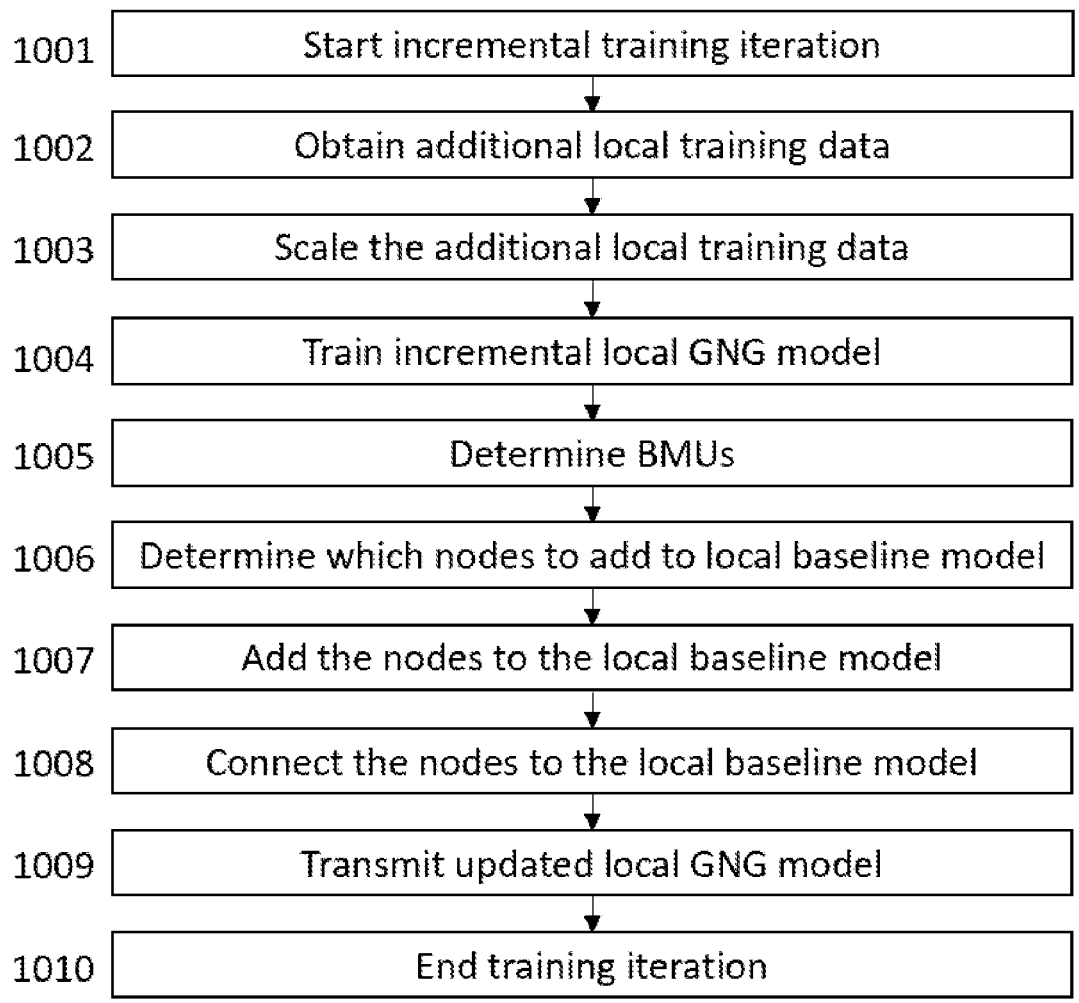
Figure 11:
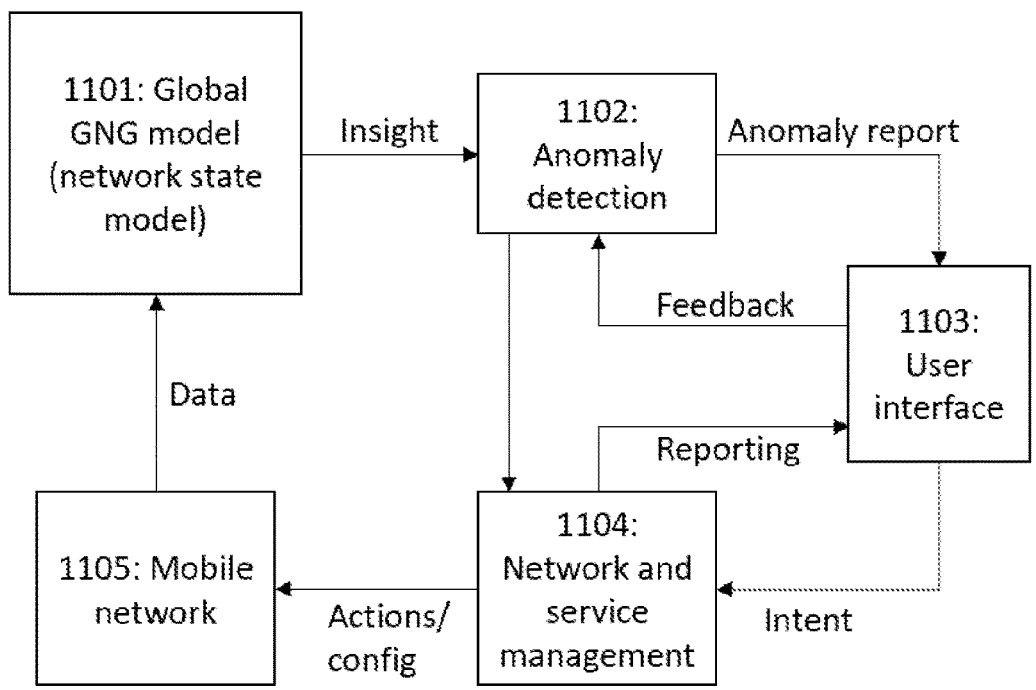
Figure 12:
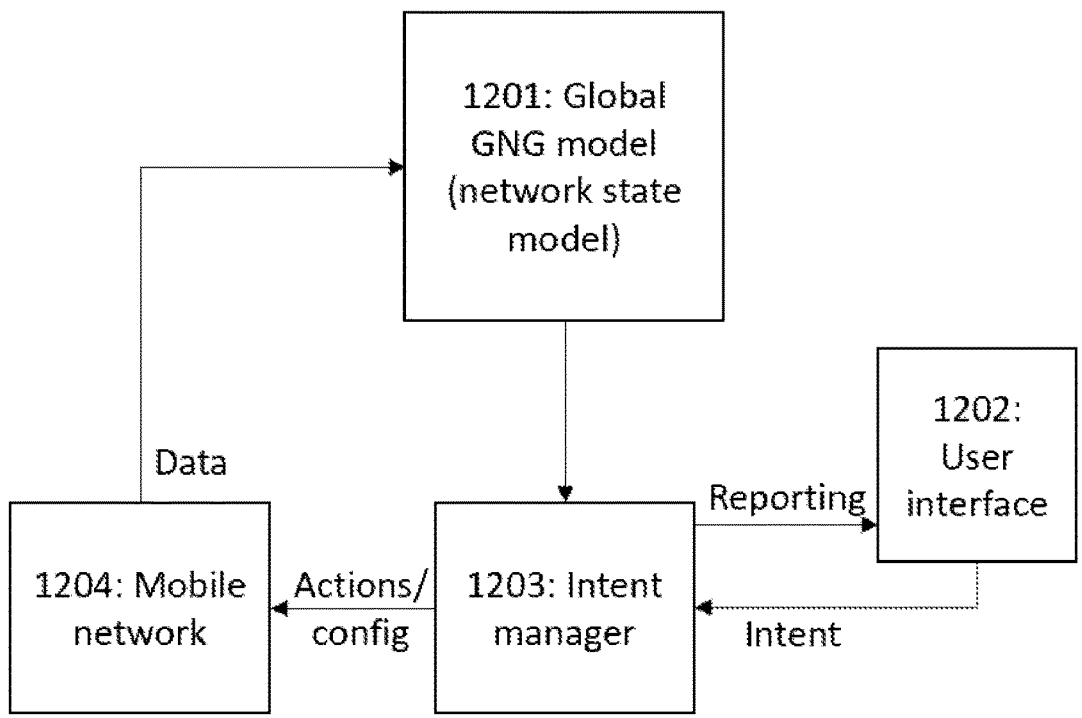
Figure 13:
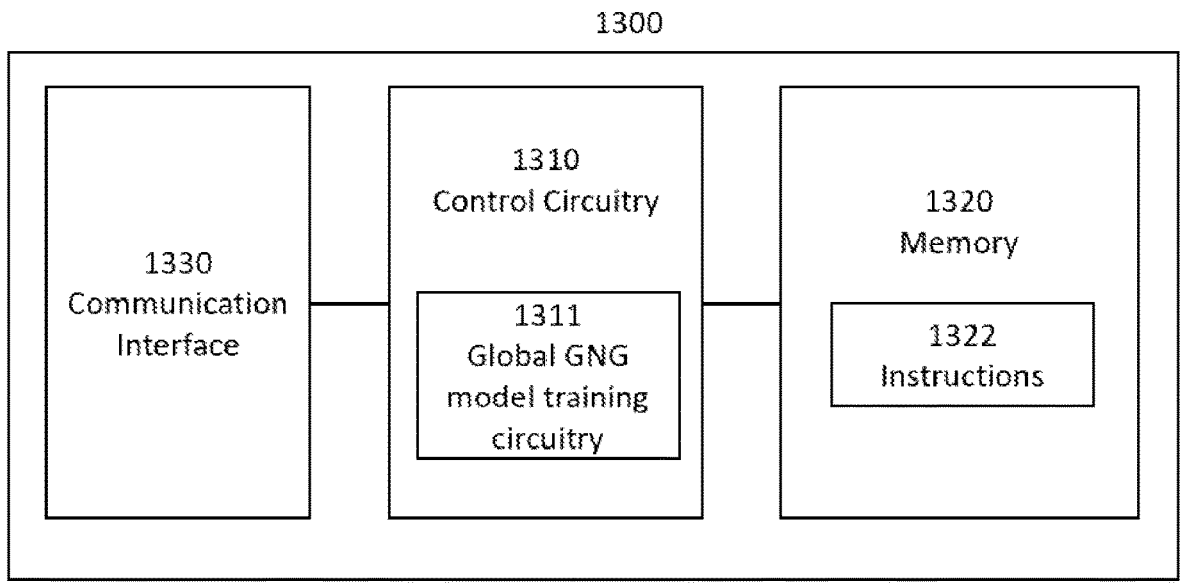
Figure 14:
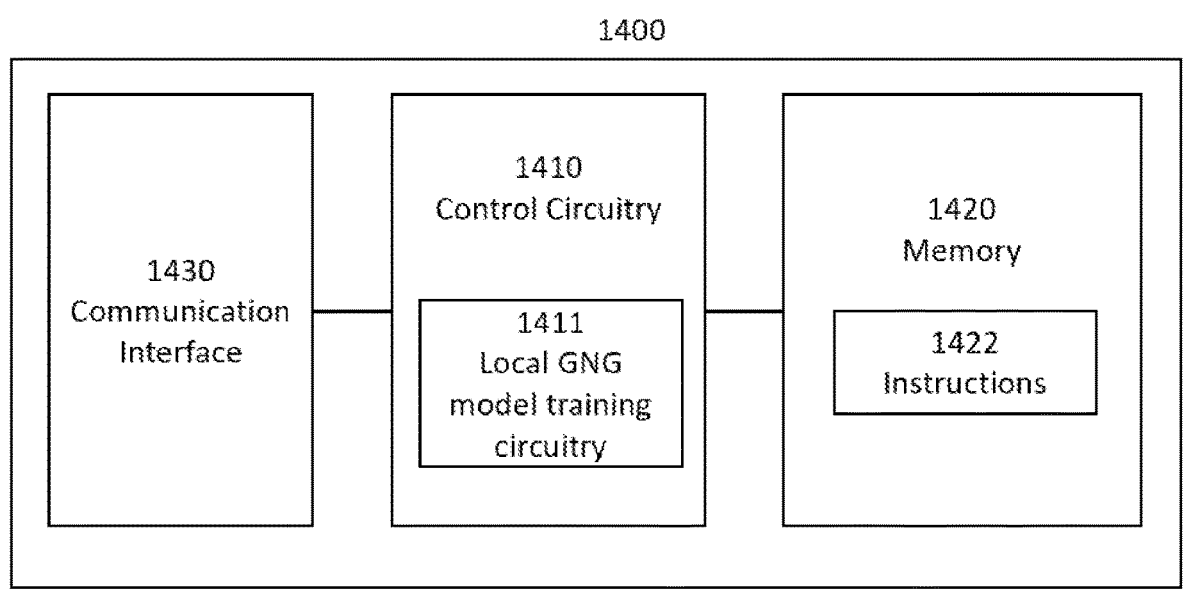

In the following, various example embodiments will be described in greater detail with reference to the accompanying drawings, in which FIG. 1 illustrates an example of a wireless communication network;

FIG. 2 illustrates an example of the training evolution of a growing neural gas model;

FIG. 3A illustrates an example of a system;
FIG. 3B illustrates an example of a system;
FIG. 3C illustrates an example of a system;
FIG. 3D illustrates an example of a system;
FIG. 3E illustrates an example of a system;
FIG. 4 illustrates a signal flow diagram;
FIG. 5 illustrates a flow chart;
FIG. 6 illustrates a flow chart;
FIG. 7 illustrates a flow chart;
FIG. 8 illustrates a flow chart;
FIG. 9 illustrates a flow chart;
FIG. 10 illustrates a flow chart;
FIG. 11 illustrates an example of using the global growing neural gas model for network state modeling and anomaly detection for closed loop automation;
FIG. 12 illustrates an example of using the global growing neural gas model for network state modeling and anomaly detection for intent-based networking;
FIG. 13 illustrates an example of an apparatus; and
FIG. 14 illustrates an example of an apparatus.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Some example embodiments described herein may be implemented in a wireless communication network comprising a radio access network based on one or more of the following radio access technologies: Global System for Mobile Communications (GSM) or any other second generation radio access technology, Universal Mobile Telecommunication System (UMTS, 3G) based on basic wideband-code division multiple access (W-CDMA), high-speed packet access (HSPA), Long Term Evolution (LTE), LTE-Advanced, fourth generation (4G), fifth generation (5G), 5G new radio (NR), 5G-Advanced (i.e., 3GPP NR Rel-18 and beyond), or sixth generation (6G). Some examples of radio access networks include the universal mobile telecommunications system (UMTS) radio access network (UTRAN), the Evolved Universal Terrestrial Radio Access network (E-UTRA), or the next generation radio access network (NG-RAN). The wireless communication network may further comprise a core network, and some example embodiments may also be applied to network functions of the core network.

It should be noted that the embodiments are not restricted to the wireless communication network given as an example, but a person skilled in the art may also apply the solution to other wireless communication networks or systems provided with necessary properties. For example, some example embodiments may also be applied to a communication system based on IEEE 802.11 specifications, or a communication system based on IEEE 802.15 specifications.

FIG. 1 depicts an example of a simplified wireless communication network showing some physical and logical entities. The connections shown in FIG. 1 may be physical connections or logical connections. It is apparent to a person skilled in the art that the wireless communication network may also comprise other physical and logical entities than those shown in FIG. 1.

The example embodiments described herein are not, however, restricted to the wireless communication network given as an example but a person skilled in the art may apply the embodiments described herein to other wireless communication networks provided with necessary properties.

The example wireless communication network shown in FIG. 1 includes an access network, such as a radio access network (RAN), and a core network 110.

FIG. 1 shows user equipment (UE) 100, 102 configured to be in a wireless connection on one or more communication channels in a radio cell with an access node (AN) 104 of an access network. The AN 104 may be an evolved Node B (abbreviated as eNB or eNodeB) or a next generation Node B (abbreviated as gNB or gNodeB), providing the radio cell. The wireless connection (e.g., radio link) from a UE to the access node 104 may be called uplink (UL) or reverse link, and the wireless connection (e.g., radio link) from the access node to the UE may be called downlink (DL) or forward link. UE 100 may also communicate directly with UE 102, and vice versa, via a wireless connection generally referred to as a sidelink (SL). It should be appreciated that the access node 104 or its functionalities may be implemented by using any node, host, server or access point etc. entity suitable for providing such functionalities.

The access network may comprise more than one access node, in which case the access nodes may also be configured to communicate with one another over links, wired or wireless. These links between access nodes may be used for sending and receiving control plane signaling and also for routing data from one access node to another access node.

The access node may comprise a computing device configured to control the radio resources of the access node. The access node may also be referred to as a base station, a base transceiver station (BTS), an access point, a cell site, a radio access node or any other type of node capable of being in a wireless connection with a UE (e.g., UEs 100, 102). The access node may include or be coupled to transceivers. From the transceivers of the access node, a connection may be provided to an antenna unit that establishes bi-directional radio links to UEs 100, 102. The antenna unit may comprise an antenna or antenna element, or a plurality of antennas or antenna elements.

The access node 104 may further be connected to a core network (CN) 110. The core network 110 may comprise an evolved packet core (EPC) network and/or a $5^{th}$ generation core network (5GC). The EPC may comprise network entities, such as a serving gateway (S-GW for routing and forwarding data packets), a packet data network gateway (P-GW) for providing connectivity of UEs to external packet data networks, and a mobility management entity (MME). The 5GC may comprise network functions, such as a user plane function (UPF), an access and mobility management function (AMF), and a location management function (LMF).

The core network 110 may also be able to communicate with one or more external networks 113, such as a public switched telephone network or the Internet, or utilize services provided by them. For example, in 5G wireless communication networks, the UPF of the core network 110 may be configured to communicate with an external data network via an N6 interface. In LTE wireless communication networks, the P-GW of the core network 110 may be configured to communicate with an external data network.

The illustrated UE 100, 102 is one type of an apparatus to which resources on the air interface may be allocated and assigned. The UE 100, 102 may also be called a wireless communication device, a subscriber unit, a mobile station, a remote terminal, an access terminal, a user terminal, a terminal device, or a user device just to mention but a few names. The UE may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or any computing device comprising a wireless modem integrated in a vehicle.

Any feature described herein with a UE may also be implemented with a corresponding apparatus, such as a relay node. An example of such a relay node may be a layer 3 relay (self-backhauling relay) towards the access node. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s), and/or between the IAB node and other IAB nodes (multi-hop scenario).

Another example of such a relay node may be a layer 1 relay called a repeater. The repeater may amplify a signal received from an access node and forward it to a UE, and/or amplify a signal received from the UE and forward it to the access node.

It should be appreciated that a UE may also be a nearly exclusive uplink-only device, of which an example may be a camera or video camera loading images or video clips to a network. A UE may also be a device having capability to operate in an Internet of Things (IoT) network, which is a scenario in which objects may be provided with the ability to transfer data over a network without requiring human-to-human or human-to-computer interaction. The UE may also utilize cloud. In some applications, the computation may be carried out in the cloud or in another UE.

The wireless communication network may also be able to support the usage of cloud services, for example at least part of core network operations may be carried out as a cloud service (this is depicted in FIG. 1 by "cloud" 114). The communication system may also comprise a central control entity, or the like, providing facilities for wireless communication networks of different operators to cooperate for example in spectrum sharing.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

5G enables using multiple input-multiple output (MIMO) antennas in the access node 104 and/or the UE 100, 102, many more base stations or access nodes than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine type applications, such as (massive) machine-type communications (mMTC), including vehicular safety, different sensors and real-time control.

In 5G wireless communication networks, access nodes and/or UEs may have multiple radio interfaces, namely below 6 GHz, cmWave and mmWave, and also being integrable with existing legacy radio access technologies, such as the LTE. Integration with the LTE may be implemented, for example, as a system, where macro coverage may be provided by the LTE, and 5G radio interface access may come from small cells by aggregation to the LTE. In other words, a 5G wireless communication network may support both inter-RAT operability (such as LTE-5G) and inter-RI operability (inter-radio interface operability, such as below 6 GHz-cmWave-mmWave). One of the concepts considered to be used in 5G wireless communication networks may be network slicing, in which multiple independent and dedicated virtual sub-networks (network instances) may be created within the substantially same infrastructure to run services that have different requirements on latency, reliability, throughput and mobility.

5G may enable analytics and knowledge generation to occur at the source of the data. This approach may involve leveraging resources that may not be continuously connected to a network, such as laptops, smartphones, tablets and sensors. Multi-access edge computing (MEC) may provide a distributed computing environment for application and service hosting. It may also have the ability to store and process content in close proximity to cellular subscribers for faster response time. Edge computing may cover a wide range of technologies, such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

In some example embodiments, an access node (e.g., access node 104) may comprise: a radio unit (RU) comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU 108 may be connected to the one or more DUs 105 for example via an F1 interface. Such an embodiment of the access node may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be a logical node hosting radio resource control (RRC), service data adaptation protocol (SDAP) and/or packet data convergence protocol (PDCP), of the NR protocol stack for an access node. The DU 105 may be a logical node hosting radio link control (RLC), medium access control (MAC) and/or physical (PHY) layers of the NR protocol stack for the access node. The operations of the DU may be at least partly controlled by the CU. It should also be understood that the distribution of functions between DU 105 and CU 108 may vary depending on implementation. The CU may comprise a control plane (CU-CP), which may be a logical node hosting the RRC and the control plane part of the PDCP protocol of the NR protocol stack for the access node. The CU may further comprise a user plane (CU-UP), which may be a logical node hosting the user plane part of the PDCP protocol and the SDAP protocol of the CU for the access node.

Cloud computing systems may also be used to provide the CU 108 and/or DU 105. A CU provided by a cloud computing system may be referred to as a virtualized CU (vCU). In addition to the vCU, there may also be a virtualized DU (vDU) provided by a cloud computing system. Furthermore, there may also be a combination, where the DU may be implemented on so-called bare metal solutions, for example application-specific integrated circuit (ASIC) or customer-specific standard product (CSSP) system-on-a-chip (SoC).

Edge cloud may be brought into the access network (e.g., RAN) by utilizing network function virtualization (NFV) and software defined networking (SDN). Using edge cloud may mean access node operations to be carried out, at least partly, in a computing system operationally coupled to a remote radio head (RRH) or a radio unit (RU) of an access node. It is also possible that access node operations may be performed on a distributed computing system or a cloud computing system located at the access node. Application of cloud RAN architecture enables RAN real-time functions being carried out at the access network (e.g., in a DU 105) and non-real-time functions being carried out in a centralized manner (e.g., in a CU 108).

It should also be understood that the distribution of functions between core network operations and access node operations may differ in future wireless communication networks compared to that of the LTE or 5G, or even be non-existent. Some other technology advancements that may be used include big data and all-IP, which may change the way wireless communication networks are being constructed and managed. 5G (or new radio, NR) wireless communication networks may support multiple hierarchies, where multi-access edge computing (MEC) servers may be placed between the core network 110 and the access node 104. It should be appreciated that MEC may be applied in LTE wireless communication networks as well.

A 5G wireless communication network ("5G network") may also comprise a non-terrestrial communication network, such as a satellite communication network, to enhance or complement the coverage of the 5G radio access network. For example, satellite communication may support the transfer of data between the 5G radio access network and the core network, enabling more extensive network coverage. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). A given satellite 106 in the mega-constellation may cover several satellite-enabled network entities that create on-ground cells. The on-ground cells may be created through an on-ground relay access node or by an access node 104 located on-ground or in a satellite.

It is obvious for a person skilled in the art that the access node 104 depicted in FIG. 1 is just an example of a part of an access network (e.g., a radio access network) and in practice, the access network may comprise a plurality of access nodes, the UEs 100, 102 may have access to a plurality of radio cells, and the access network may also comprise other apparatuses, such as physical layer relay access nodes or other entities. At least one of the access nodes may be a Home eNodeB or a Home gNodeB. A Home gNodeB or a Home eNodeB is a type of access node that may be used to provide indoor coverage inside a home, office, or other indoor environment.

Additionally, in a geographical area of an access network (e.g., a radio access network), a plurality of different kinds of radio cells as well as a plurality of radio cells may be provided. Radio cells may be macro cells (or umbrella cells) which may be large cells having a diameter of up to tens of kilometers, or smaller cells such as micro-, femto- or pico-cells. The access node(s) of FIG. 1 may provide any kind of these cells. A cellular radio network may be implemented as a multilayer access networks including several kinds of radio cells. In multilayer access networks, one access node may provide one kind of a radio cell or radio cells, and thus a plurality of access nodes may be needed to provide such a multilayer access network.

For fulfilling the need for improving performance of access networks, the concept of "plug-and-play" access nodes may be introduced. An access network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's access network, may aggregate traffic from a large number of Home eNodeBs or Home gNodeBs back to a core network of the operator.

6G wireless communication networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G may include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

Some example embodiments relate to federated learning (FL) and growing neural gas (GNG). Some example embodiments enable to use the GNG machine learning algorithm in a federated learning environment, and, in particular, provide a method which enables the merging of multiple GNG models into one GNG model.

Federated learning is a machine learning concept, where multiple distributed trainers (DT) and a central trainer (CT) collaboratively build a model. A given DT has its own local data source, which can be accessed by the associated DT. Federated learning starts by the CT initializing a new (untrained) model and sending a copy of it to each DT. Each DT performs a model training step based on the model and its own local data. After the training step, each DT sends its updated model back to the CT. The CT then combines or merges the updated models (or model updates) to a new version of the central model. Then the updated central model may be shared back to each distributed trainer, and the training cycle may be repeated until the central model has converged to a stable state (e.g., after each DT has used all of its own local training data, possibly multiple times, during the training).

FIG. 2 illustrates an example of the training evolution of a GNG model 200. The GNG is an unsupervised machine learning technique to learn the topology of a dataset, which models the dataset through a finite number of interconnected units (nodes), so that the units represent the training dataset with a certain (pre-defined) accuracy. For example, initially, the GNG model 200 may have two units. During model training, new units (nodes) are added to the GNG model 200 (thus "growing" the model), and existing units may also be updated to represent the dataset with an ever increasing accuracy.

In a communications network (e.g., the wireless communication network of FIG. 1), the local data available for instances of a network element type (e.g., base station, eNB, gNB, UE) comprises just samples from a limited area of the total possible data space. For example, the distribution of a 15-minute aggregated total downlink data measured in base station A and base station B may be significantly different. This depends on several factors, such as the configuration parameters, location of the base station (e.g., urban or rural), etc. In others words, the different instances measure different parts of the theoretical global characteristic (state space) of the corresponding network element type.

Thus, none of the individual instances (e.g., base station A or base station B) alone produce data that can be used to train such a GNG model that represents the global state space. On the other hand, transferring all of the local data to a central location, where a model could be trained to represent the global state space, consumes a large amount of network resources.

Since it is not efficient to transfer all of the local data to one central location and train a global state model at once, it may be beneficial to apply the GNG algorithm at individual instances (e.g., individual base stations) to learn their local state model using the locally available data. The local models may then be shared with a central trainer, which merges these local models to assemble a global state model. However, currently, there is no method available that would enable the merging of GNG models. Thus, some example embodiments may provide a solution for merging locally trained GNG state models to assemble a global GNG state model.

Some example embodiments provide a method that enables a central trainer to collect local GNG models (GNG fragments) from a plurality of distributed trainers, wherein the local GNG models represent a fraction of the possible states of a certain type of system, and build a global state model of that type of system by merging the received local GNG models. For example, the global state model may comprise a network-wide distribution of a multidimensional performance indicator distribution of RAN nodes (e.g., base stations). This distributed state model learning concept is illustrated in FIG. 3A.

Below it is described how the GNG modelling paradigm and method can be practically used in a federated learning scenario. The idea is that DTs are building local GNG models based on local training data, and the DTs then send the local GNG model to the CT, which uses the local GNG models as training data to train a global GNG model.

Some example embodiments are described below using principles and terminology of 5G radio access technology without limiting the example embodiments to 5G radio access technology, however.

FIG. 3A illustrates an example of a system, to which some example embodiments may be applied. The system comprises a central trainer 331 and a plurality of distributed trainers 311, 312, 313. Although three distributed trainers 311, 312, 313 are shown in FIG. 3, it should be noted that the number of distributed trainers may also be different than three. In other words, the plurality of distributed trainers may comprise two or more distributed trainers.

The distributed trainers 311, 312, 313, operating in one of the instances (e.g., RAN node) of the subject system type, receive local training data 301, 302, 303 comprising state information from that instance (e.g., RAN node), which represents a fragment of the global state model 341. A given distributed trainer 311, 312, 313 trains a local GNG model 321, 322, 323 based on the locally available system state information 301, 302, 303, which represents different (partially overlapping) fragments of the global system state model 341. In other words, a given local GNG model 321, 322, 323 represents a local state model of that instance (e.g., RAN node).

When a given DT 311, 312, 313 is finished with training the local GNG model 321, 322, 323, it sends the trained local GNG model 321, 322, 323 to the CT 331. The CT 331 merges the received local GNG models 321, 322, 323 to build a global GNG model 341 representing a global system state model. For example, the global system state model may be a network-wide state model of a plurality of RAN nodes.

The CT 331 may share the global GNG model 341 with the DTs 311, 312, 313, and the DTs 311, 312, 313 may then further train and refine the received global GNG model 341 based on additional local training data, which may comprise previously unobserved system states manifested in the local instance (e.g., RAN node). The DTs 311, 312, 313 may eventually share the updated GNG models with the CT 331, which may incorporate the updates into the global GNG model 341 and share it with other DTs 311, 312, 313. This cycle may continue in an asynchronous manner by gradually refining and completing the global state model 341 to include all possible states an instance (e.g., RAN node) of the subject system type can ever experience.

Some further implementation options of the system are illustrated in FIG. 3B, FIG. 3C, FIG. 3D, and FIG. 3E. These options may be differentiated by the relative deployment location of the data sources 351, 352, 353, distributed trainers 311, 312, 313, and the central trainer 331.

FIG. 3B illustrates an example of a system, in which the data sources 351, 352, 353 and distributed trainers 311, 312, 313 are co-located. The data sources 351, 352, 353 refer to the sources of the local training data 301, 302, 303, which is provided to the corresponding distributed trainer 311, 312, 313 for training the local GNG model 321, 322, 323.

In the option illustrated in FIG. 3B, a given distributed trainer 311, 312, 313 is deployed at the same entity, such as a radio access network node 361, 362, 363, which generates the local training data 301, 302, 303. The radio access network node 361, 362, 363 may correspond to the access node 104 of FIG. 1. For example, the radio access network node 361, 362, 363 may comprise a gNB or an eNB. Herein a given local GNG model 321, 322, 323 represents a local state model of the corresponding radio access network node 361, 362, 363.

The DTs 311, 312, 313 receive the local training data 301, 302, 303 from the local data source 351, 352, 353, train the local GNG models 321, 322, 323 based on the local training data 301, 302, 303, and share the local GNG models 321, 322, 323 with the CT 331, which in turn merges the local GNG models 321, 322, 323 (fragments) to form a global state model 341 of the plurality of radio access network nodes 361, 362, 363. The central trainer 331 may be comprised in, for example, an operations support system (OSS) or a network data analytics function (NWDAF) 364. For example, the OSS and NWDAF may be located in the core network 110.

An advantage of the deployment option of FIG. 3B is that the local training data 301, 302, 303 does not need to be transferred from the local RAN node 361, 362, 363, thus saving backhaul bandwidth. The distributed trainers 311, 312, 313 produce local GNG models 321, 322, 323 that are fitted to the local data 301, 302, 303 of the network element (RAN node) 361, 362, 363 and represents that fragment of data with better accuracy. On the other hand, the training operations consume computation resources of the RAN nodes 361, 362, 363.

FIG. 3C illustrates an example of a system, in which the DTs 311, 312 and data sources 351, 352, 353 are separated.

In this option, the DTs 311, 312 may be deployed close to the network edge, for example on a MEC server 365, 366. The radio access network nodes 361, 362, 363 transfer the local training data 301, 302, 303 to the associated MEC server 365, 366, where the DTs 311, 312 train the local GNG model 321, 322, which represents the states of the associated entities in that training cluster. For example, the local GNG model 321 trained by the first DT 311 may represent the states of at least two radio access network nodes 361, 362, whereas the local GNG model 322 trained by the second DT 312 may represent the states of at least one radio access network node 363.

The DTs 311, 312 then share the local GNG models 321, 322 with the CT 331, which in turn merges the local GNG models 321, 322 (fragments) to form a global GNG model 341 representing a global state model of the plurality of radio access network nodes 361, 362, 363.

An advantage of the option of FIG. 3C is that no computation resources are used at the RAN nodes 361, 362, 363 to train the local GNG models 321, 322. However, some bandwidth needs be used to transfer the local training data 301, 302, 303 to the MEC servers 365, 366.

FIG. 3D illustrates an example of a system with a hierarchical architecture with intermediate trainers (ITs) 371, 372. A given intermediate trainer 371, 372 is a special type of trainer that acts both as a distributed trainer and a central trainer.

In this option, there are DTs 311, 313, 371, 372 both at some of the individual radio access network nodes 361, 363 as well as at MEC servers 365, 366, while some radio access network node(s) 362 may not run a DT. The radio access network nodes 361, 363 with a co-located DT 311, 313 train their own local GNG models 321, 323 and then share the local GNG models 321, 323 with the associated MEC server 365, 366. The radio access network node(s) 362 without a DT deployed share their local training data 302 with the associated MEC server 365.

In the MEC servers 365, 366, a so-called intermediate trainer 371, 372 is deployed. On the interface facing towards the RAN nodes 361, 362, 363, the intermediate trainer 371, 372 acts as a CT, i.e., collects local GNG models 321, 323 from the associated RAN nodes 361, 363 and merges them to form an intermediate GNG model 324, 325. In case the intermediate trainer 371 receives raw local training data 302 from a RAN node 362, the intermediate trainer 371 uses this local training data 302 to further refine the intermediate model 324.

On the CT-facing interface, the intermediate trainer 371, 372 acts as a DT, i.e., shares the intermediate GNG model 324, 325 with the CT 331. The CT 331 finally merges all received GNG models 324, 325 into one global GNG model 341.

It should be noted that any of the above options of FIG. 3B, FIG. 3C and FIG. 3D may also be combined in an actual deployment. For example, some network segments may be configured according to the option of FIG. 3B, while other network segments may be configured according to the option of FIG. 3C or FIG. 3D.

FIG. 3E illustrates an example of a system, in which the DTs 311, 312, 313 and CT 331 are co-located. In some data collection and storage models, the network elements (e.g., RAN nodes) 361, 362, 363 that generate data may report this data 301, 302, 303 to a central data storage 381. The central data storage 381 may be linked with a cloud computing environment, which can be used to instantiate the DTs 311, 312, 313 and the CT 331. The CT 331 may virtually distribute parts 301, 302, 303 of the total training dataset to the DTs 311, 312, 313, let them train their local GNG models 321, 322, 323, collect the resulting local GNG models 321, 322, 323, and then build a global GNG model based on the local GNG models 321, 322, 323.

FIG. 4 illustrates a signal flow diagram according to an example embodiment. Although two DTs 311, 312 (DT1 and DT2) are shown in FIG. 4, it should be noted that the number of DTs may also be different than two. In other words, there may be two or more DTs. In addition, the signaling procedure illustrated in FIG. 4 may be extended and applied according to the actual number of DTs.

Referring to FIG. 4, at 401, a central trainer 331 determines a configuration to be used for training a plurality of local growing neural gas models 321, 322 at a plurality of distributed trainers 311, 312.

The configuration may comprise at least one of: a set of data features to be used for training the plurality of local growing neural gas models, a requirement on a minimum amount of local training data to be used for training the plurality of local growing neural gas models, a requirement on a variability of the local training data to be used for training the plurality of local growing neural gas models, a requirement on a proportion of missing data points in the local training data to be used for training the plurality of local growing neural gas models, a scaling technique to be used for scaling the local training data, a training strategy to be used for training the plurality of local growing neural gas models, or a previous version of a global growing neural gas model to be used for initializing the training of the plurality of local growing neural gas models.

For example, in the first training iteration, the central trainer 331 may initialize a new untrained global growing neural gas model and send a copy of it to each distributed trainer 311, 312. In this case, the previous version of the global growing neural gas model may refer to the untrained global growing neural gas model.

The training strategy may comprise one of: a first strategy indicating to initialize the training of the plurality of local growing neural gas models by using an empty growing neural gas model, a second strategy indicating to initialize the training of the plurality of local growing neural gas models by using a previous version of a local growing neural gas model, or a third strategy indicating to initialize the training of the plurality of local growing neural gas models by using the previous version of the global growing neural gas model.

At 402, the central trainer 331 transmits the configuration to the plurality of distributed trainers 311, 312.

At 403, based on the received configuration, a first distributed trainer (DT1) 311 of the plurality of distributed trainers 311, 312 trains a local growing neural gas model 321 based on local training data 301 comprising state information associated with at least a first radio access network node 361. The local growing neural gas model 321 trained by the first distributed trainer 311 represents a local state model of at least the first radio access network node 361.

For example, the local training data may comprise a set of performance counters of at least the first radio access network node 361. Performance counters are metrics used to measure and monitor the performance and behavior of a radio access network node (e.g., gNB or eNB). Performance counters may be used to collect data on various aspects of the RAN node, such as at least one of: the number of successful and failed connections, the amount of data transmitted and received, the signal quality, the power consumption, etc.

At 404, the first distributed trainer 311 transmits the local growing neural gas model 321 trained by the first distributed trainer 311 to the central trainer 331.

At 405, based on the received configuration, a second distributed trainer (DT2) 312 of the plurality of distributed trainers 311, 312 trains a local growing neural gas model 322 based on local training data 302 comprising state information associated with at least a second radio access network node 362 different to the first radio access network node 361. The local growing neural gas model 322 trained by the second distributed trainer 312 represents a local state model of at least the second radio access network node 362.

At 406, the second distributed trainer 312 transmits the local growing neural gas model 322 trained by the second distributed trainer 312 to the central trainer 331. In other words, the central trainer 331 receives a plurality of local growing neural gas models 321, 322 comprising at least the local growing neural gas models trained at the first distributed trainer 311 and the second distributed trainer 312.

At 407, the central trainer 331 trains the global growing neural gas model 341 based on the plurality of local growing neural gas models 321, 322, wherein the global growing neural gas model 341 represents a global state model of a plurality of radio access network nodes comprising at least the first radio access network node 361 and the second radio access network node 362. This training results in a new version of the global growing neural gas model 341.

For example, the central trainer 331 may train the global growing neural gas model 341 by merging all of the plurality of local growing neural gas models 321, 322 into the global growing neural gas model 341 at the same time. In other words, the plurality of local growing neural gas models 321, 322 may be received at different times, but the central trainer 331 may wait until it has received all of the local growing neural gas models 321, 322 from the plurality of distributed trainers 311, 312 before merging them to the global growing neural gas model 341.

As another example, the central trainer 331 may train the global growing neural gas model 341 by merging the plurality of local growing neural gas models 321, 322 one at a time into the global growing neural gas model 341 according to a sequence in which the plurality of local growing neural gas models 321, 322 are received. In other words, in this case, the central trainer 331 does not need to wait for all of the local growing neural gas models 321, 322 to arrive. Instead, the central trainer 331 may merge each local GNG model to the global GNG model 341 as each local GNG model arrives at the central trainer 331.

At 408, the central trainer 331 may transmit the trained global growing neural gas model 341 to the plurality of distributed trainers 311, 312.

For example, the central trainer 331 may transmit the global growing neural gas model 341 to the plurality of distributed trainers 311, 312 based on determining that the global growing neural gas model 341 has not converged, in order to perform additional training of the global growing neural gas model 341. For example, the central trainer 331 may determine whether the global growing neural gas model 341 has converged by evaluating an error decrement associated with adding a node to the global growing neural gas model 341.

At 409, the first distributed trainer 311 may obtain an updated local growing neural gas model 321 by training or updating the global growing neural gas model 341 based on additional local training data (i.e., new local training data) available at the first distributed trainer 311. The additional local training data may comprise additional state information associated with at least the first radio access network node 361. In other words, the global growing neural gas model 341 may be used as a baseline model for further training at the first distributed trainer 311.

Alternatively, the first distributed trainer 311 may obtain the updated local growing neural gas model 321 by training or updating the local growing neural gas model 321 trained at 403 based on the additional local training data available at the first distributed trainer 311. In other words, in this case, the local growing neural gas model 321 may be used as a baseline model for further training at the first distributed trainer 311.

At 410, the first distributed trainer 311 may transmit the updated local growing neural gas model 321 to the central trainer 331.

At 411, the second distributed trainer 312 may obtain an updated local growing neural gas model 322 by training or updating the global growing neural gas model 341 based on additional local training data (i.e., new local training data) available at the second distributed trainer 312. The additional local training data may comprise additional state information associated with at least the second radio access network node 362. In other words, the global growing neural gas model 341 may be used as a baseline model for further training at the second distributed trainer 312.

Alternatively, the second distributed trainer 312 may obtain the updated local growing neural gas model 322 by training or updating the local growing neural gas model 322 trained at 405 based on the additional local training data available at the second distributed trainer 312. In other words, in this case, the local growing neural gas model 322 may be used as a baseline model for further training at the second distributed trainer 312.

At 412, the second distributed trainer 312 may transmit the updated local growing neural gas model 322 to the central trainer 331.

At 413, the central trainer 331 may perform additional training of the global growing neural gas model 341 based on the plurality of updated local growing neural gas models 321, 322 received from the plurality of distributed trainers 311, 312 until the global growing neural gas model 341 has converged.

For example, the global growing neural gas model 341 may be trained for anomaly detection of the plurality of radio access network nodes 361, 362. The central trainer 331 may publish the global growing neural gas model 341 for example by transmitting it to an entity responsible for the anomaly detection, and this entity may then use the global growing neural gas model 341 for the anomaly detection purposes. Thus, the global growing neural gas model 341 may be used to automatically detect and predict issues and congestion before they cause an outage or network performance issues.

As another example, the global GNG model may be used for intent-based management systems to provide a description of the actual state of the managed system and make management decisions based on that. In this way, the global GNG model may be used to optimize the plurality of radio access network nodes 361, 362.

Herein the terms 'first distributed trainer' and 'second distributed trainer' are used to distinguish the distributed trainers, and they do not necessarily mean a specific order or specific identifiers of the distributed trainers.

FIG. 5 illustrates a flow chart according to an example embodiment of a method performed by an apparatus 1300. For example, the apparatus 1300 may be, or comprise, or be comprised in, a central trainer 331. As an example, the central trainer 331 may be comprised in an entity of a core network 110, such as in an OSS or NWDAF 364.

Referring to FIG. 5, in block 501, a plurality of local growing neural gas models 321, 322, 323 are received from a plurality of distributed trainers 311, 312, 313, wherein a given local growing neural gas model 321 of the plurality of local growing neural gas models 321, 322, 323 represents a local state model of at least one radio access network node 361.

Herein intermediate trainers 371, 372 may also be considered as distributed trainers from the perspective of the central trainer, and intermediate GNG models 324, 325 may also be considered as local GNG models from the perspective of the central trainer. In block 502, a global growing neural gas model 341 is trained based on the plurality of local growing neural gas models 321, 322, 323, wherein the global growing neural gas model 341 represents a global state model of a plurality of radio access network nodes 361, 362, 363.

The global GNG model can be used for various purposes. For example, the global GNG model may be trained for or used for anomaly detection or optimization of the plurality of radio access network nodes.

For example, the apparatus may detect, based on the global growing neural gas model, an overload of at least a subset of the plurality of radio access network nodes; and initiate, based on detecting the overload, a load balancing action for reducing a load of at least the subset of the plurality of radio access network nodes.

As another example, the apparatus may detect, based on the global growing neural gas model, a failure state of at least a subset of the plurality of radio access network nodes; and trigger, based on detecting the failure state, an alarm indicating the failure state.

As another example, the global GNG model may be used as a baseline model for future training processes or iterations.

FIG. 6 illustrates a flow chart according to an example embodiment of a method performed by an apparatus 1300. For example, the apparatus 1300 may be, or comprise, or be comprised in, a central trainer 331. As an example, the central trainer 331 may be comprised in an entity of a core network 110, such as in an OSS or NWDAF 364.

Referring to FIG. 6, in block 601, the CT 331 determines a configuration to be used for training a plurality of local growing neural gas models at a plurality of distributed trainers 311, 312, 313.

For example, the operator of the network may create a new federated state model learning process by defining at least the following input parameters for the configuration: a set of data features, such as a set of performance counters, to be used for training the plurality of local growing neural gas models and the global growing neural gas model, one or more requirements on the data quality of the local training data to be used for training the plurality of local GNG models and the global training data to be used for training the global GNG model, a scaling technique to be used for scaling the local training data and the global training data, a local training strategy to be used for training the plurality of local growing neural gas models, or a previous version of the global growing neural gas model to be used as a baseline model for initializing the training of the plurality of local growing neural gas models.

For example, the one or more requirements on the data quality may comprise at least one of: a requirement on a minimum amount of the training data, a requirement on a variability of the training data, or a requirement on a proportion (fraction) of missing data points in the training data.

The requirement on the proportion of missing data points may also be referred to as a "fraction of NAs", where "NA" stands for "not available", indicating that a particular feature or attribute of the data is missing or unknown. The fraction of NAs is a measure of the completeness of the data set. If there are too many missing values in the training data, it may lead to biased or inaccurate models. Therefore, the training data may be preprocessed based on the requirement to fill in missing values or to remove incomplete data records before training the GNG model. This requirement may also be used as a way to simulate missing or incomplete data in real-world scenarios and ensure that the GNG model is trained to handle such cases. For example, if the requirement is set for 10% of missing data points, it may mean that 10% of the data in the training dataset should be intentionally removed or replaced with missing values before training the GNG model.

The scaling technique refers to the statistical scaling method to be used to transform feature values into a common value range. Some examples of the scaling technique may include standardization or normalization.

The local training strategy refers to the strategy to be used by the distributed trainers, when initializing a training iteration of a local GNG model. The local training strategy may comprise one of the following three options: a first strategy called a forget strategy, a second strategy called a local baseline strategy, or a third strategy called a global baseline strategy.

The first strategy (forget strategy) indicates to initialize the training of the plurality of local growing neural gas models by using an empty growing neural gas model. In other words, in this case, each training iteration of the local GNG model starts with an empty model, i.e., no baseline model is used.

In case a baseline model is used, it means that the training process or iteration is initiated by referencing a previously created global GNG model (in case of the global baseline strategy) or a previously created local GNG model (in case of the local baseline strategy).

The second strategy (local baseline strategy) indicates to initialize the training of the plurality of local growing neural gas models by using a previous version of a local growing neural gas model. In other words, the local baseline strategy indicates to use the actual local GNG model to initialize the new training iteration, i.e., continue to train the local GNG model with new local training data.

The third strategy (global baseline strategy) indicates to initialize the training of the plurality of local growing neural gas models by using the previous version of the global growing neural gas model, which may be included in the configuration in case the global baseline strategy is used. In other words, the global baseline strategy indicates to use the global GNG model, shared by the CT, to initialize the new training iteration, i.e., continue to train the global GNG model with new local training data.

The operator of the network may also define the set of distributed trainers to be included in the federated learning process. For example, the distributed trainers may be filtered based on their geographical location.

In block 602, the CT initiates the training process.

In block 603, the CT connects to the DTs defined in the set of distributed trainers and configures the DT training process, i.e., transmits the configuration to the plurality of distributed trainers.

The CT may first discover or determine whether all of the plurality of distributed trainers in the set of DTs are available and capable of performing the training of the plurality of local growing neural gas models. For example, the CT may determine whether the DTs have the required resources available, have the required data features available, etc.

The DTs that are successfully verified (i.e., determined to be available and capable of performing the training) are configured with the configuration determined in block 601. In other words, the CT may transmit the configuration to the plurality of distributed trainers, based on determining that the plurality of distributed trainers are available and capable of performing the training of the plurality of local growing neural gas models.

In block 604, the CT triggers a local training iteration at the verified DTs. For example, the CT may transmit, to the plurality of distributed trainers, an indication to start the training of the plurality of local growing neural gas models, based on determining that the plurality of distributed trainers are available and capable of performing the training of the plurality of local growing neural gas models.

In block 605, the plurality of distributed trainers run one training iteration to train the plurality of local GNG models, and the DTs share the results with the CT. In other words, the CT receives the plurality of local growing neural gas models from the plurality of distributed trainers. The training performed at the DTs is illustrated in further detail in FIG. 9.

Each local growing neural gas model of the plurality of local growing neural gas models represents a local state model of at least one radio access network node 361, 362, 363.

In block 606, the CT runs one training iteration for training the global growing neural gas model based on the plurality of local growing neural gas models. For example, the CT may use the unit vectors of the local GNG models as training data for training the global GNG model. The training performed at the CT is illustrated in further detail in FIG. 7.

In a growing neural gas model, unit vectors represent the weight or position of the neurons in the model. Each unit vector has a direction in the feature space, and the relative distances between unit vectors indicate the topology of the model. The input data may be mapped to the model by finding the nearest unit vectors to the input data in the feature space. By adjusting the unit vectors based on the input data, the model can learn to represent the underlying patterns in the data.

The training process of a GNG model may run until the trainer eventually stops the training process based on some stopping criteria. Such stopping criteria may include, for example, a threshold on the maximum number of nodes in the GNG model, the number of training cycles, or whether some model convergence criteria has been fulfilled. The convergence criteria may refer to a threshold on the minimum achieved improvement of a model update operation. In case of GNG, the convergence of the training may be measured by checking the decrement of model error when adding a new node to the GNG model. If adding a new node does not imply a large enough error decrement, then it is assumed that the GNG model has converged and the training process can be stopped.

In block 607, the CT checks or determines whether the global growing neural gas model has converged, for example by evaluating an error decrement associated with adding a node to the global growing neural gas model.

If the CT determines that the global GNG model has not converged (block 607: no), then the process returns to block 604, i.e., the CT triggers another training iteration. For example, in case the global baseline training strategy is applied, then the CT may transmit the global GNG model to the distributed trainers to be updated based on additional local training data available at the distributed trainers, and the CT may then perform additional training of the global GNG model based on the updated local GNG models received from the distributed trainers.

Alternatively, if the CT determines that the global GNG model has converged (block 607: yes), then: the process proceeds to block 608. For example, the CT may determine that the global GNG model has converged, if adding a new node to the global GNG model does not provide a large enough error decrement (i.e., adding a new node does not improve the GNG model substantially anymore). In other words, when the error decrement falls below a certain threshold or stabilizes, it may indicate that the global GNG model has converged and further training may not be necessary.

In block 608, the CT publishes the global growing neural gas model. For example, the global growing neural gas model may be transmitted to another network entity, or used at the apparatus for various purposes.

For example, the global GNG model may be trained or used for anomaly detection of the plurality of radio access network nodes. The global growing neural gas model may represent a global state model of a plurality of radio access network nodes. The states represented by the nodes of the global growing neural gas model may be normal operation or some anomaly states. When the actual state of a given RAN node is some kind of anomaly, this means that the RAN node is not operating in an optimal state.

One possible such state may be an overload (i.e., extreme load). If such a state is detected, a load balancing action may be initiated or triggered. For example, some UEs may be forced to neighbor RAN nodes by temporarily changing handover parameters. In other words, the apparatus (or the other network entity) may detect, based on the global growing neural gas model, an overload of at least a subset of the plurality of radio access network nodes; and initiate, based on detecting the overload, a load balancing action for reducing a load of at least the subset of the plurality of radio access network nodes.

Another example is a failure state, in which case an alarm may be raised to draw the attention of the operator to the failure state. In other words, the apparatus (or the other network entity) may detect, based on the global growing neural gas model, a failure state of at least a subset of the plurality of radio access network nodes; and trigger, based on detecting the failure state, an alarm indicating the failure state.

In general, a given anomalous state of a RAN node may be associated with a corrective action that drives the RAN node to the normal operation state. The corrective actions may be specific to the use case or operator or implementation.

As another example, the global GNG model may be used as a baseline model for future training processes or iterations.

As another example, the global GNG model may be used for intent-based management systems to provide a description of the actual state of the managed system and make management decisions based on that.

FIG. 7 illustrates a flow chart according to an example embodiment of a method performed by an apparatus 1300. For example, the apparatus 1300 may be, or comprise, or be comprised in, a central trainer 331. As an example, the central trainer 331 may be comprised in an entity of a core network 110, such as in an OSS or NWDAF 364.

FIG. 7 illustrates one training iteration performed at the CT for example in block 606 of FIG. 6, or at 407 of FIG. 4.

Referring to FIG. 7, in block 701, a CT training iteration is started. After the CT 331 triggers a local DT training iteration (see block 604 of FIG. 6), it puts its operation on hold and remains in this stage until at least the first local GNG model is received from one of the distributed trainers 312, 313, 314 in the set of DTs.

In block 702, the CT 331 receives, from a distributed trainer, a local growing neural gas model and one or more scaling parameters used to scale local training data of the local growing neural gas model at the distributed trainer.

In block 703, the CT obtains one or more un-scaled unit vectors by un-scaling one or more unit vectors of the local growing neural gas model by using the one or more scaling parameters received together with the local growing neural gas model. Each data feature may be un-scaled with its corresponding scaling parameter(s).

For example, in case of standardization, the one or more scaling parameters may comprise at least a mean (average) value and a standard deviation value per a data feature of the local training data. In this case, the un-scaling may mean that each element of each unit vector is multiplied with the corresponding deviation value and the mean value is added to the result. This transposes each data point to its original, i.e., un-scaled value. In block 704, the CT adds or stores the one or more un-scaled unit vectors to a global training database comprising global training data to be used for training the global GNG model.

In block 705, the CT checks or determines whether a training trigger policy has been fulfilled or not.

For example, the training trigger policy may be a rule that the CT has to wait until all of the distributed trainers in the set of DTs return with a local GNG model or report an error. In this case, the global growing neural gas model may be trained by merging all of the plurality of local growing neural gas models into the global growing neural gas model at the same time. If the training trigger policy dictates that all distributed trainers in the set of DTs need to send their local GNG models created during a local training iteration, then the CT waits until it has received the local GNG models from all of the distributed trainers before proceeding to block 706.

As another example, the training trigger policy may allow to process each new local GNG model in sequence (referred to as incremental GNG merging herein). In this case, the CT does not need to wait until it has received all of the local GNG models, and the global growing neural gas model may be trained by merging the plurality of local growing neural gas models one at a time into the global growing neural gas model according to a sequence in which the plurality of local growing neural gas models are received.

If the training trigger policy is not fulfilled (block 705: no), then the process returns to block 702, i.e., the CT receives another local GNG model and the associated scaling parameter(s) from another distributed trainer. In other words, each time a new local GNG model is received, the CT runs blocks 703, 704 and 705 until the CT training trigger policy is fulfilled.

In block 706, in case the training trigger policy is fulfilled (block 705: yes), the CT retrieves the collected global training data from the global training database.

In block 707, the CT determines or computes one or more global scaling parameters based on the retrieved global training data. For example, the one or more global scaling parameters may comprise at least a mean value and a standard deviation value per a data feature of the global training data.

In block 708, the CT obtains scaled global training data by scaling the global training data based on the one or more global scaling parameters. The scaling may depend on the selected scaling technique. For example, in case of standardization, the one or more global scaling parameters may comprise the mean value and standard deviation value. In this case, when scaling the global training data, the mean value may be subtracted from the sample value, and the result may be divided by the standard deviation value.

In block 709, the CT trains a global GNG model based on the scaled global training data. For example, the CT may train the global GNG model from scratch or continue to train a previous version of the global GNG model with the new global training data. In other words, the CT collects local GNG models and uses their associated unit vectors as global training data to build or train the global GNG model.

Following block 709, in block 710, the training iteration ends.

FIG. 8 illustrates a flow chart according to an example embodiment of a method performed by an apparatus 1400. For example, the apparatus 1400 may be, or comprise, or be comprised in, a distributed trainer 311, 312, 313. As an example, the distributed trainer 311, 312, 313 may be comprised in a RAN node 104, 361, 362, 363 or a MEC server 365, 366, or in an entity of a core network 110, such as in an OSS or NWDAF 364.

Referring to FIG. 8, in block 801, a local growing neural gas model 321 is trained based on local training data 301 comprising state information associated with at least one radio access network node 361, wherein the local growing neural gas model 321 represents a local state model of the at least one radio access network node 361.

In block 802, the local growing neural gas model 321 is transmitted to a central trainer 331 configured to train a global growing neural gas model 341 based on a plurality of local growing neural gas models 321, 322, 323 trained at a plurality of distributed trainers 311, 312, 313, wherein the plurality of local growing neural gas models 321, 322, 323 comprise at least the local growing neural gas model 321 transmitted to the central trainer, wherein the global growing neural gas model 341 represents a global state model of a plurality of radio access network nodes 361, 362, 363.

Herein an intermediate trainer 371, 372 may also be considered as a central trainer from the perspective of the distributed trainer.

The global GNG model can be used for various purposes. For example, the global GNG model may be trained for anomaly detection of the plurality of radio access network nodes. As another example, the global GNG model may be used as a baseline model for future training processes or iterations. As another example, the global GNG model may be used for intent-based management systems to provide a description of the actual state of the managed system and make management decisions based on that.

FIG. 9 illustrates a flow chart according to an example embodiment of a method performed by an apparatus 1400. For example, the apparatus 1400 may be, or comprise, or be comprised in, a distributed trainer 311, 312, 313. As an example, the distributed trainer 311, 312, 313 may be comprised in a RAN node 104, 361, 362, 363 or a MEC server 365, 366.

FIG. 9 illustrates one training iteration performed at a DT for example at 403 or 405 of FIG. 4, or in block 604 of FIG. 6.

Referring to FIG. 9, in block 901, the DT 311, 312, 313 receives a configuration from the central trainer 331 for training a local growing neural gas model at the DT.

As described above, the configuration may comprise at least one of: a set of data features to be used for training the local growing neural gas model, a requirement on a minimum amount of the local training data to be used for training the local growing neural gas model, a requirement on a variability of the local training data to be used for training the local growing neural gas model, a requirement on a proportion of missing data points in the local training data to be used for training the plurality of local growing neural gas models, a scaling technique to be used for scaling the local training data, a training strategy to be used for training the local growing neural gas model, or a previous version of the global growing neural gas model to be used for initializing the training of the local growing neural gas model.

The training strategy may comprise one of: a first strategy (forget strategy) indicating to initialize the training of the local growing neural gas model by using an empty growing neural gas model, a second strategy (local baseline strategy) indicating to initialize the training of the local growing neural gas model by using a previous version of the local growing neural gas model, or a third strategy (global baseline strategy) indicating to initialize the training of the local growing neural gas model by using the previous version of the global growing neural gas model (which may be included in the configuration in case the global baseline strategy is applied).

In block 902, based on the received configuration, the DT starts a new training iteration for training the local GNG model.

In block 903, based on the received configuration, the DT obtains or collects local training data for training the local GNG model. For example, the DT may have access to a local database, where the data to be used for training is collected. The DT retrieves the currently available training data, or a part of it, according to the configuration received from the CT. The local training data may comprise state information, such as performance counters, associated with at least one radio access network node.

In block 904, the DT determines or computes one or more scaling parameters based on the retrieved local training data. For example, in case standardization is defined by the configuration received from the CT, then the one or more scaling parameters may comprise at least a mean value and a standard deviation value per a data feature of the local training data. In other words, the mean (average) and a standard deviation (sigma) of the data may be computed per feature, i.e., the result is a pair of mean and standard deviation values for each selected feature.

In block 905, the DT obtains scaled local training data by scaling the local training data based on the one or more scaling parameters. For example, each data feature in the local training data may be scaled using the one or more scaling parameters. The scaling may depend on the selected scaling technique. For example, in case of standardization, the one or more scaling parameters may comprise the mean value and standard deviation value. In this case, when scaling the local training data, the mean value may be subtracted from the sample value, and the result may be divided by the standard deviation value.

The data features are the input vectors that are used to train the model. Scaling of data features refers to the process of transforming the range of the data features to a standardized range to ensure that all features are weighted equally during model training. This is done to avoid any bias towards data features with larger magnitudes or ranges. Scaling can be achieved using various techniques, such as min-max scaling, z-score scaling, and unit vector scaling. The choice of scaling technique depends on the type of data and the requirements of the model being trained.

In block 906, the DT trains a local growing neural gas model based on the scaled local training data and the training strategy indicated in the configuration. The local growing neural gas model represents a local state model of the at least one radio access network node.

In case the configuration indicates to use the first training strategy (forget strategy), the DT trains the local GNG model from scratch (i.e., by starting with an empty GNG model) using the scaled training data.

In case the configuration indicates to use the second training strategy (local baseline strategy), the DT uses a previous version of its local GNG model as a baseline model and continues training it with the new scaled training data. In the first training iteration, or in case the local GNG model is not available, the DT may fall back to the forget strategy, i.e., building the local GNG model from scratch.

In case the configuration indicates to use the third training strategy (global baseline strategy), the DT uses the global GNG model provided by the CT as a baseline model and continues training it with the new scaled training data. In the first training iteration, or in case the global GNG model is not available, the DT may fall back to the forget strategy, i.e., building the local GNG model from scratch.

During the training process, the model adapts the positions of the unit vectors to represent the structure of the input data (i.e., the local training data). The goal of the training may be to arrange the unit vectors so that they form a low-dimensional representation of the input data that captures the essential features of the data. The unit vectors can be thought of as prototypes that represent different regions of the input space, and the data features may be used to adjust the position and connectivity of the prototypes until they form an accurate representation of the data.

In block 907, when the training of the local GNG model is completed (i.e., the local GNG model has converged), the local GNG model is shared with the CT, i.e., transmitted to the CT. As described above, the convergence of the training can be measured by checking the decrement of model error when adding a new node to the local GNG model. If adding a new node does not imply large enough error decrement, then it is assumed that the local GNG model has converged and the training process or iteration can be stopped.

Following block 907, in block 908, the training iteration ends.

FIG. 10 illustrates a flow chart according to an example embodiment of a method performed by an apparatus 1400. For example, the apparatus 1400 may be, or comprise, or be comprised in, a distributed trainer 311, 312, 313. As an example, the distributed trainer 311, 312, 313 may be comprised in a RAN node 104, 361, 362, 363 or a MEC server 365, 366.

The method of FIG. 10 provides an alternative to DTs (in case they are configured to use a baseline model, i.e., the local baseline training strategy or global baseline training strategy) to incorporate new local training data in consecutive training iterations. The CT may also use this method to merge local GNG models, created by DTs, into the global GNG model.

For using this method at a DT, the assumption is that there is a local GNG model and one or more previously determined scaling parameters available as an input for the method. For example, the training of FIG. 9 may be performed as a first training iteration, and the training of FIG. 10 may be performed in consecutive training iterations. In case there is no previous local GNG model available, then the DT may perform the training illustrated in FIG. 9.

Referring to FIG. 10, in block 1001, an incremental training iteration is started. The local GNG model trained in a previous training iteration (e.g., the local GNG model trained in block 906 of FIG. 9), as well as the previously determined one or more scaling parameters (e.g., from block 904 of FIG. 9) may be used as input for the incremental training iteration. In other words, the local GNG model trained in the previous training iteration may be used as a baseline model for the incremental training iteration.

In block 1002, the DT obtains additional local training data (i.e., new training data compared to previous training iterations). The assumption is that there is new training data available at the DT, i.e., data points, which have not been used in previous training iterations.

In block 1003, the DT obtains scaled additional local training data by scaling the additional local training data based on the one or more scaling parameters. For example, the DT may use the same scaling parameter(s) that were determined in block 904 of FIG. 9.

In block 1004, the DT trains an incremental local growing neural gas model from scratch based on the scaled additional local training data.

In block 1005, the DT determines or computes a best matching unit (BMU) per a data point (e.g., for each data point) of the scaled additional local training data both in the local baseline GNG model and the incremental local GNG model. The BMU is the node that is closest to a given data point in a GNG model (e.g., the local baseline GNG model and the incremental local GNG model). For example, determining the BMU may mean that the closest unit (i.e., node) to the data point is identified and the distance to that node from the data point is determined. For example, Euclidean distance may be used as the distance metric, but any other metric can alternatively be used depending on the actual use case.

In block 1006, based on the BMU or the associated distance value(s), the DT decides which nodes to take over from the incremental local GNG model to the local baseline GNG model. In other words, the DT determines, based on the best matching unit, one or more nodes to add to the local baseline growing neural gas model from the incremental local growing neural gas model.

For example, the one or more nodes may be determined as follows. For a node n of the incremental local GNG model, let $S_n=\{s\}$ denote the set of samples in the additional local training data for which node n is the BMU in the incremental local GNG model. Calculate two averages for the samples in $S_n$:

$$d'_n = \frac{\Sigma_{s \in S_n} \text{dist\_incr}(s)}{|S_n|},$$

i.e., the average distance from their closest unit in the incremental local GNG model (by definition their distance from node n), and $$d_n = \frac{\Sigma_{s \in S_n} \text{dist\_base}(s)}{|S_n|},$$

i.e., the average distance from their closest unit in the local baseline GNG model. dist_incr(s) is the distance between one sample and node n in the incremental local GNG model. dist_base(s) is the distance between one sample and node n in the local baseline GNG model.

Node n may be taken over into the local baseline GNG model if $$\frac{d'_n}{d_n} < t_{merge},$$

where $t_{merge}$ is a threshold value (e.g., a predefined parameter of the method), for example $0 < t_{merge} < 1$. The lower the threshold, the fewer nodes will be taken over.

In block 1007, the DT obtains an updated local growing neural gas model by adding the determined one or more nodes to the local baseline GNG model from the incremental local GNG model. This means that the new nodes are added to the set of nodes of the local baseline GNG model. This creates a new version of the local GNG model, i.e., the updated local baseline GNG model will be the new updated local GNG model.

In block 1008, the DT connects the added one or more nodes to one or more original nodes of the local baseline GNG model.

For example, the node(s) may be connected according to the following method. The DT may determine or compute the average edge length (i.e., distances of the two nodes that it connects) of the local baseline GNG model. For each new (added) node, the method seeks the k nearest neighbour nodes (k may be a small integer number, for example one or more) and adds an edge between the neighbour nodes and the new node, if the resulting edge length is not greater than the average edge length. In case the new node cannot be connected to any other node, then an edge is added between the node and its closest neighbour node, even if the edge length is greater than the average edge length of the local baseline GNG model.

The edge refers to the connection or link between two nodes in the model. The edge represents the relationship or similarity between the two nodes in terms of their input data features. The strength or weight of the edge may be used to represent the degree of similarity between the connected nodes.

In block 1009, the DT shares the updated local GNG model with the CT, i.e., the DT transmits the updated local GNG model to the CT. The DT may also transmit the one or more scaling parameters to the CT.

Following block 1009, in block 1010, the training iteration ends.

The blocks, related functions, and information exchanges (messages) described above by means of FIGS. 4-10 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

FIG. 11 illustrates an example of using the global GNG model 1101 for network state modeling and anomaly detection 1102 for closed loop automation. The global GNG model 1101 may be trained according to any of the example embodiments described above.

The global GNG model 1102 may represent a network state model of a mobile network 1102 (e.g., the wireless communication network of FIG. 1). For example, the mobile network 1102 may comprise a plurality of radio access network nodes and/or UEs.

As described above, the federated learning process of the global GNG model 1102 may be used to optimize the training process. The global GNG model 1102 may be trained based on local GNG models, which may be trained by a plurality of distributed trainers based on multi-dimensional performance management (PM), configuration management (CM), and/or fault management (FM) data received from one or more individual RAN nodes of the mobile network 1105.

PM data includes information on network performance, such as throughput, latency, and packet loss. CM data includes information on network configuration, such as network topology, routing information, and device configurations. FM data includes information on network faults such as errors, alarms, and failures.

The global GNG model 1101 (knowledge base) of anomalies and sub-optimal network states may be shared with individual entities, such as an anomaly detection function 1102, which is capable of making sense of events experienced by other entities. An anomaly experienced by a single entity may be shared with all other entities of the same type with a common representation provided by the global GNG model 1101.

The anomaly detection function 1102 may be configured to detect non-trivial, impactful network and service problems, which may be unrecognizable through other monitoring practices before they evolve to severe degradations. The anomaly detection function 1102 may enable failure prediction and detection of early degradation of the mobile network 1105 (or a part of it). The anomaly detection function 1102 may correlate multiple data sources (e.g., from different network domains).

The anomaly detection function 1102 may report the detected anomalies and sub-optimal network states to a network and service management function 1104 and/or to a user via a user interface 1103. For example, the anomaly detection function 1102 may report on and rank the top anomalous conditions in the mobile network 1105 and link them to the most likely root causes. The network and service management function 1104 may trigger automatic corrective actions and/or configuration at the mobile network 1105, leading to an autonomous closed loop network management.

FIG. 12 illustrates an example of using the global GNG model 1201 for network state modeling and anomaly detection for intent-based networking. The global GNG model 1201 may be trained according to any of the example embodiments described above.

An intent-based network manager 1203 is a type of network management system that uses high-level business or user intent, for example provided via a user interface 1202, to automate and optimize network configuration, provisioning, and operation. The intent-based network manager 1203 allows network administrators to define policies and goals in terms of business objectives and outcomes, rather than low-level technical details. The intent-based network manager 1203 then translates these high-level intentions into specific network configurations and actions, for example using machine learning, automation, and orchestration. This approach can help simplify and accelerate network operations, reduce errors, and improve overall network performance and reliability.

The intent-based network manager 1203 needs to understand its own state on multiple levels, such as end-to-end service, network domain, cloud infrastructure, user-plane, control-plane, software health, etc. Federated learning of the global GNG model 1201 (network state model) provides a comprehensive multi-aspect state model that can be used to drive the intent-based network manager 1203 to trigger informed configuration, optimization and troubleshooting actions of the mobile network 1204.

GNG modelling enables to learn the network state model (different aspects of it) from almost any data source, such as customer data record (CDR), customer relationship management (CRM), key performance indicators (KPIs), PM counters, CM data, and even logs (e.g., system logs, performance logs, security logs, etc.).

FIG. 13 illustrates an example of an apparatus 1300 comprising means for performing one or more of the example embodiments described above. For example, the apparatus 1300 may be an apparatus such as, or comprising, or comprised in, central trainer 331. As an example, the means may be provided by an entity of a core network 110, such as an OSS or NWDAF 364.

The apparatus 1300 may comprise, for example, a circuitry or a chipset applicable for realizing one or more of the example embodiments described above. The apparatus 1300 may be an electronic device or computing system comprising one or more electronic circuitries. The apparatus 1300 may comprise a control circuitry 1310 such as at least one processor, and at least one memory 1320 storing instructions 1322 which, when executed by the at least one processor, cause the apparatus 1300 to carry out one or more of the example embodiments described above. Such instructions 1322 may, for example, include computer program code (software). The at least one processor and the at least one memory storing the instructions may provide the means for providing or causing the performance of any of the methods and/or blocks described above. For example, the control circuitry 1310 may comprise a global growing neural gas model training circuitry 1311 configured to train a global growing neural gas model based on a plurality of local growing neural gas models as described above with reference to any of FIG. 4, 5, 6, 7 or 11.

The processor is coupled to the memory 1320. The processor is configured to read and write data to and from the memory 1320. The memory 1320 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1320 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

The memory 1320 may be implemented using any suitable data storage technology, such as semiconductor-based memory devices, flash memory, magnetic memory devices and systems, optical memory devices and systems, fixed memory and/or removable memory.

The apparatus 1300 may further comprise or be connected to a communication interface 1330 comprising hardware and/or software for realizing communication connectivity according to one or more communication protocols. The communication interface 1330 may comprise at least one transmitter (Tx) and at least one receiver (Rx) that may be integrated to the apparatus 1300 or that the apparatus 1300 may be connected to. The communication interface 1330 may provide means for performing some of the blocks for one or more example embodiments described above. The communication interface 1330 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

The communication interface 1330 provides the apparatus with communication capabilities to communicate in the cellular communication system. The communication interface 1330 may, for example, provide a radio, cable or fiber interface to one or more radio access network nodes or distributed trainers.

It is to be noted that the apparatus 1300 may further comprise various components not illustrated in FIG. 13. The various components may be hardware components and/or software components.

FIG. 14 illustrates an example of an apparatus 1400 comprising means for performing one or more of the example embodiments described above. For example, the apparatus 1400 may be an apparatus such as, or comprising, or comprised in, a distributed trainer 311, 312, 313. As an example, the distributed trainer 311, 312, 313 may be comprised in a radio access network node 104, 361, 362, 363 or a MEC server 365, 366.

The radio access network node may also be referred to, for example, as a network element, a next generation radio access network (NG-RAN) node, a NodeB, an eNB, a gNB, a base transceiver station (BTS), a base station, an NR base station, a 5G base station, an access node, an access point (AP), a cell site, a relay node, a repeater, an integrated access and backhaul (IAB) node, an IAB donor node, a distributed unit (DU), a central unit (CU), a baseband unit (BBU), a radio unit (RU), a radio head, a remote radio head (RRH), or a transmission and reception point (TRP).

The apparatus 1400 may comprise, for example, a circuitry or a chipset applicable for realizing one or more of the example embodiments described above. The apparatus 1400 may be an electronic device comprising one or more electronic circuitries. The apparatus 1400 may comprise a communication control circuitry 1410 such as at least one processor, and at least one memory 1420 storing instructions 1422 which, when executed by the at least one processor, cause the apparatus 1400 to carry out one or more of the example embodiments described above. Such instructions 1422 may, for example, include computer program code (software). The at least one processor and the at least one memory storing the instructions may provide the means for providing or causing the performance of any of the methods and/or blocks described above. For example, the control circuitry 1410 may comprise a local growing neural gas model training circuitry 1411 configured to train a local growing neural gas model based on local training data comprising state information associated with at least one radio access network node, as described above with reference to any of FIG. 4, 8, 9 or 10.

The processor is coupled to the memory 1420. The processor is configured to read and write data to and from the memory 1420. The memory 1420 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1420 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 1420 or, alternatively or additionally, they may be received, by the apparatus, via an electromagnetic carrier signal and/or may be copied from a physical entity such as a computer program product. Execution of the computer readable instructions causes the apparatus 1400 to perform one or more of the functionalities described above.

The memory 1420 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data, such as a current neighbour cell list, and, in some example embodiments, structures of frames used in the detected neighbour cells.

The apparatus 1400 may further comprise or be connected to a communication interface 1430, such as a radio unit, comprising hardware and/or software for realizing communication connectivity with one or more wireless communication devices according to one or more communication protocols. The communication interface 1430 comprises at least one transmitter (Tx) and at least one receiver (Rx) that may be integrated to the apparatus 1400 or that the apparatus 1400 may be connected to. The communication interface 1430 may provide means for performing some of the blocks for one or more example embodiments described above. The communication interface 1430 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

The communication interface 1430 provides the apparatus with radio communication capabilities to communicate in the wireless communication network. The communication interface may, for example, provide a radio interface to one or more wireless communication devices. The apparatus 1400 may further comprise or be connected to another interface towards a central trainer or core network such as the network coordinator apparatus or AMF, and/or to the access nodes of the cellular communication system.

It is to be noted that the apparatus 1400 may further comprise various components not illustrated in FIG. 14. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the embodiments.

The invention claimed is:

1. An apparatus comprising at least one processor, and at least one memory storing instructions that, when executed by the at least one processor, cause the apparatus at least to:
   receive a plurality of local growing neural gas models from a plurality of distributed trainers comprised in a plurality of radio access network nodes or in a plurality of multi-access edge computing servers,
   wherein a local growing neural gas model of the plurality of local growing neural gas models represents a local state model of at least one radio access network node,
   wherein the local growing neural gas model was trained based on local training data comprising a set of performance counters that are metrics used to measure and monitor performance and behavior of the at least one radio access network node; and
   train a global growing neural gas model for anomaly detection or optimization of the plurality of radio access network nodes based on the plurality of local growing neural gas models,
   wherein the global growing neural gas model represents a global state model of the plurality of radio access network nodes,
   wherein the global growing neural gas model is trained by:
   merging all of the plurality of local growing neural gas models into the global growing neural gas model at a same time; or
   merging the plurality of local growing neural gas models one at a time into the global growing neural gas model according to a sequence in which the plurality of local growing neural gas models are received.

2. The apparatus according to claim 1, further being caused to:
   determine a configuration to be used for training the plurality of local growing neural gas models at the plurality of distributed trainers; and
   transmit the configuration to the plurality of distributed trainers,
   wherein the configuration comprises at least one of:
   a set of data features to be used for training the plurality of local growing neural gas models,
   a requirement on a minimum amount of local training data to be used for training the plurality of local growing neural gas models,
   a requirement on a variability of the local training data to be used for training the plurality of local growing neural gas models,
   a requirement on a proportion of missing data points in the local training data to be used for training the plurality of local growing neural gas models,
   a scaling technique to be used for scaling the local training data, a training strategy to be used for training the plurality of local growing neural gas models, or a previous version of the global growing neural gas model to be used for initializing the training of the plurality of local growing neural gas models.

3. The apparatus according to claim 2, wherein the training strategy comprises one of:
a first strategy indicating to initialize the training of the plurality of local growing neural gas models by using an empty growing neural gas model,
a second strategy indicating to initialize the training of the plurality of local growing neural gas models by using a previous version of a local growing neural gas model, or
a third strategy indicating to initialize the training of the plurality of local growing neural gas models by using the previous version of the global growing neural gas model.

4. The apparatus according to claim 2, further being caused to:
determine whether the plurality of distributed trainers are available and capable of performing the training of the plurality of local growing neural gas models; and
transmit, to the plurality of distributed trainers, the configuration and an indication to start the training of the plurality of local growing neural gas models, based on determining that the plurality of distributed trainers are available and capable of performing the training of the plurality of local growing neural gas models.

5. The apparatus according to claim 1, further being caused to:
obtain one or more un-scaled unit vectors by un-scaling, per a local growing neural gas model of the plurality of local growing neural gas models, one or more unit vectors of the local growing neural gas model by using one or more scaling parameters used to scale local training data of the local growing neural gas model at a corresponding distributed trainer;
add the one or more un-scaled unit vectors to global training data;
determine one or more global scaling parameters based on the global training data; and
obtain scaled global training data by scaling the global training data based on the one or more global scaling parameters,
wherein the global growing neural gas model is trained based on the scaled global training data.

6. The apparatus according to claim 1, further being caused to:
determine whether the global growing neural gas model has converged by evaluating an error decrement associated with adding a node to the global growing neural gas model; and
based on determining that the global growing neural gas model has not converged, perform, until the global growing neural gas model has converged, additional training of the global growing neural gas model based on a plurality of updated local growing neural gas models received from the plurality of distributed trainers.

7. The apparatus according to claim 6, further being caused to:
transmit the global growing neural gas model to the plurality of distributed trainers,
wherein at least one updated local growing neural gas model of the plurality of updated local growing neural gas models was trained at a distributed trainer of the plurality of distributed trainers by updating the global growing neural gas model based on additional local training data available at the distributed trainer.

8. The apparatus according to claim 6, wherein at least one updated local growing neural gas model of the plurality of updated local growing neural gas models was trained at a distributed trainer of the plurality of distributed trainers by updating at least one local growing neural gas model of the plurality of local growing neural gas models based on additional local training data available at the distributed trainer.

9. The apparatus according to claim 1, further being caused to:
detect, based on the global growing neural gas model, an overload of at least a subset of the plurality of radio access network nodes; and
initiate, based on detecting the overload, a load balancing action for reducing a load of at least the subset of the plurality of radio access network nodes.

10. The apparatus according to claim 1, further being caused to:
detect, based on the global growing neural gas model, a failure state of at least a subset of the plurality of radio access network nodes; and
trigger, based on detecting the failure state, an alarm indicating the failure state.

11. An apparatus comprising at least one processor, and at least one memory storing instructions that, when executed by the at least one processor, cause the apparatus at least to:
train a local growing neural gas model based on local training data comprising a set of performance counters that are metrics used to measure and monitor performance and behavior of at least one radio access network node,
wherein the local growing neural gas model represents a local state model of the at least one radio access network node; and
transmit the local growing neural gas model to a central trainer configured to train a global growing neural gas model for anomaly detection or optimization of a plurality of radio access network nodes based on a plurality of local growing neural gas models trained at a plurality of distributed trainers,
the central trainer being configured to train the global growing neural gas model by:
merging all of the plurality of local growing neural gas models into the global growing neural gas model at a same time; or
merging the plurality of local growing neural gas models one at a time into the global growing neural gas model according to a sequence in which the plurality of local growing neural gas models are received,
wherein the plurality of local growing neural gas models comprise at least the local growing neural gas model transmitted to the central trainer,
wherein the global growing neural gas model represents a global state model of the plurality of radio access network nodes,
wherein the apparatus comprises a distributed trainer comprised in a radio access network node or in a multi-access edge computing server.

12. The apparatus according to claim 11, further being caused to:
receive, from the central trainer, a configuration for training the local growing neural gas model,
wherein the local growing neural gas model is trained based on the configuration, wherein the configuration comprises at least one of:
a set of data features to be used for training the local growing neural gas model,
a requirement on a minimum amount of the local training data to be used for training the local growing neural gas model,
a requirement on a variability of the local training data to be used for training the local growing neural gas model,
a requirement on a proportion of missing data points in the local training data to be used for training the local growing neural gas models,
a scaling technique to be used for scaling the local training data,
a training strategy to be used for training the local growing neural gas model, or
a previous version of the global growing neural gas model to be used for initializing the training of the local growing neural gas model.

13. The apparatus according to claim 12, wherein the training strategy comprises one of:
a first strategy indicating to initialize the training of the local growing neural gas model by using an empty growing neural gas model,
a second strategy indicating to initialize the training of the local growing neural gas model by using a previous version of the local growing neural gas model, or
a third strategy indicating to initialize the training of the local growing neural gas model by using the previous version of the global growing neural gas model.

14. The apparatus according to claim 11, further being caused to:
determine one or more scaling parameters based on the local training data;
obtain scaled local training data by scaling the local training data based on the one or more scaling parameters,
wherein the local growing neural gas model is trained based on the scaled local training data; and
transmit the one or more scaling parameters to the central trainer.

15. The apparatus according to claim 14, wherein the one or more scaling parameters comprise at least a mean value and a standard deviation value per a data feature of the local training data.

16. The apparatus according to claim 14, further being caused to:
obtain additional local training data;
obtain scaled additional local training data by scaling the additional local training data based on the one or more scaling parameters;
train an incremental local growing neural gas model based on the scaled additional local training data;
determine a best matching unit per a data point of the scaled additional local training data in the local growing neural gas model and the incremental local growing neural gas model, wherein the best matching unit is a node closest to the data point in the local growing neural gas model and the incremental local growing neural gas model;
determine, based on the best matching unit, one or more nodes to add to the local growing neural gas model from the incremental local growing neural gas model;
obtain an updated local growing neural gas model by adding the one or more nodes to the local growing neural gas model from the incremental local growing neural gas model, and connecting the one or more nodes to one or more original nodes of the local growing neural gas model; and
transmit the updated local growing neural gas model to the central trainer.

17. The apparatus according to claim 11, further being caused to:
receive the global growing neural gas model from the central trainer;
obtain an updated local growing neural gas model by training the global growing neural gas model based on additional local training data associated with the at least one radio access network node; and
transmit the updated local growing neural gas model to the central trainer.

18. A method comprising:
receiving a plurality of local growing neural gas models from a plurality of distributed trainers comprised in a plurality of radio access network nodes or in a plurality of multi-access edge computing servers,
wherein a local growing neural gas model of the plurality of local growing neural gas models represents a local state model of at least one radio access network node,
wherein the local growing neural gas model was trained based on local training data comprising a set of performance counters that are metrics used to measure and monitor performance and behavior of the at least one radio access network node; and
training a global growing neural gas model for anomaly detection or optimization of the plurality of radio access network nodes based on the plurality of local growing neural gas models,
wherein the global growing neural gas model represents a global state model of the plurality of radio access network nodes,
wherein the global growing neural gas model is trained by:
merging all of the plurality of local growing neural gas models into the global growing neural gas model at a same time; or
merging the plurality of local growing neural gas models one at a time into the global growing neural gas model according to a sequence in which the plurality of local growing neural gas models are received.

19. A method comprising:
training, by a distributed trainer, a local growing neural gas model based on local training data comprising a set of performance counters that are metrics used to measure and monitor performance and behavior of at least one radio access network node,
wherein the local growing neural gas model represents a local state model of the at least one radio access network node; and
transmitting, by the distributed trainer, the local growing neural gas model to a central trainer configured to train a global growing neural gas model for anomaly detection or optimization of a plurality of radio access network nodes based on a plurality of local growing neural gas models trained at a plurality of distributed trainers,
the central trainer being configured to train the global growing neural gas model by:
merging all of the plurality of local growing neural gas models into the global growing neural gas model at a same time; or
merging the plurality of local growing neural gas models one at a time into the global growing neural gas model according to a sequence in which the plurality of local growing neural gas models are received, wherein the plurality of local growing neural gas models comprise at least the local growing neural gas model transmitted to the central trainer, wherein the global growing neural gas model represents a global state model of the plurality of radio access network nodes, wherein the distributed trainer is comprised in a radio access network node or in a multi-access edge computing server.

20. A non-transitory computer readable medium comprising program instructions which, when executed by an apparatus, cause the apparatus to perform at least the following:

receiving a plurality of local growing neural gas models from a plurality of distributed trainers comprised in a plurality of radio access network nodes or in a plurality of multi-access edge computing servers, wherein a local growing neural gas model of the plurality of local growing neural gas models represents a local state model of at least one radio access network node, wherein the local growing neural gas model was trained based on local training data comprising a set of performance counters that are metrics used to measure and monitor performance and behavior of the at least one radio access network node; and training a global growing neural gas model for anomaly detection or optimization of the plurality of radio access network nodes based on the plurality of local growing neural gas models, wherein the global growing neural gas model represents a global state model of the plurality of radio access network nodes, wherein the global growing neural gas model is trained by:

merging all of the plurality of local growing neural gas models into the global growing neural gas model at a same time; or merging the plurality of local growing neural gas models one at a time into the global growing neural gas model according to a sequence in which the plurality of local growing neural gas models are received.

* * * * *